United States Patent
Suzuki et al.

(10) Patent No.: US 9,591,261 B2
(45) Date of Patent: Mar. 7, 2017

(54) VIDEO TELEPHONE DEVICE AND VIDEO TELEPHONE PROCESSING METHOD

(71) Applicant: Hitachi Maxell, Ltd., Ibaraki-shi, Osaka (JP)

(72) Inventors: Motoyuki Suzuki, Ibaraki (JP); Nobuo Masuoka, Ibaraki (JP); Kazuhiko Yoshizawa, Ibaraki (JP); Hideo Nishijima, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 14/911,858

(22) PCT Filed: Sep. 24, 2013

(86) PCT No.: PCT/JP2013/075615
§ 371 (c)(1),
(2) Date: Feb. 12, 2016

(87) PCT Pub. No.: WO2015/044994
PCT Pub. Date: Apr. 2, 2015

(65) Prior Publication Data
US 2016/0205344 A1 Jul. 14, 2016

(51) Int. Cl.
*H04N 7/14* (2006.01)

(52) U.S. Cl.
CPC .................. *H04N 7/147* (2013.01)

(58) Field of Classification Search
CPC   H04N 7/14; H04N 7/147; H04N 7/15; H04N 7/152; H04N 5/272; H04M 3/567
USPC ........................................... 348/14.01–14.16
See application file for complete search history.

(56) References Cited

U.S. PATENT DOCUMENTS

| | | | |
|---|---|---|---|
| 9,225,933 B2 | 12/2015 | Nakamura | |
| 2007/0009028 A1* | 1/2007 | Lee | H04N 7/147 375/240.08 |
| 2012/0327172 A1* | 12/2012 | El-Saban | G06K 9/00228 348/14.02 |

FOREIGN PATENT DOCUMENTS

| JP | 04-057582 A | 2/1992 |
|---|---|---|
| JP | 2005-210191 A | 8/2005 |
| JP | 2006-013856 A | 1/2006 |
| JP | 2007-174281 A | 7/2007 |
| JP | 2013-110472 A | 6/2013 |

OTHER PUBLICATIONS

International Search Report of PCT/JP2013/075615.

* cited by examiner

*Primary Examiner* — Melur Ramakrishnaiah
(74) *Attorney, Agent, or Firm* — Mattingly & Malur, PC

(57) ABSTRACT

Provided are a video telephone device and a video telephone processing method in which a video call environment with excellent usability is provided even when used by a plurality of persons. A video telephone device that performs a call with another video telephone device via a network photographs an image of a speaker, recognizes the speaker based on the photographed image, and changes a background image in an image to be transmitted according to a recognition result. Thus, for example, when the users who are not close to each other perform a call, a situation in which an image showing a state of a room is supplied as a background image is solved.

10 Claims, 22 Drawing Sheets

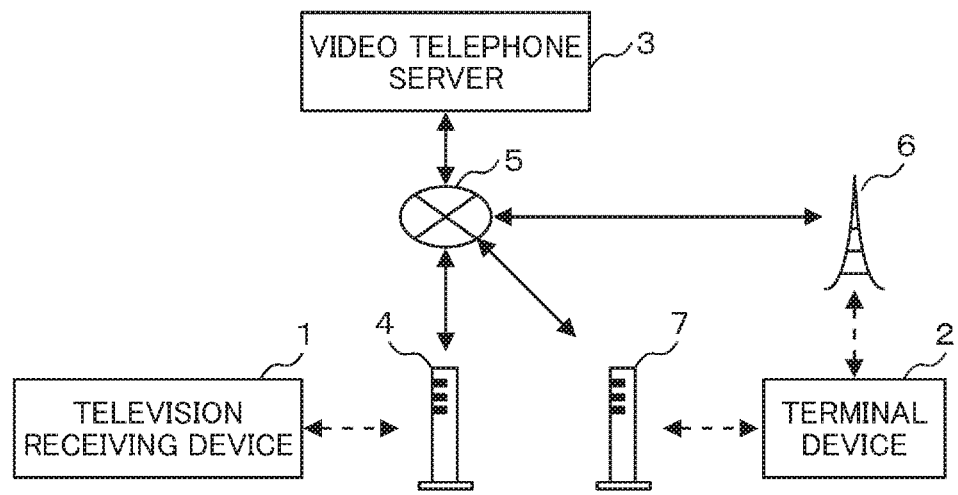
F I G. 2
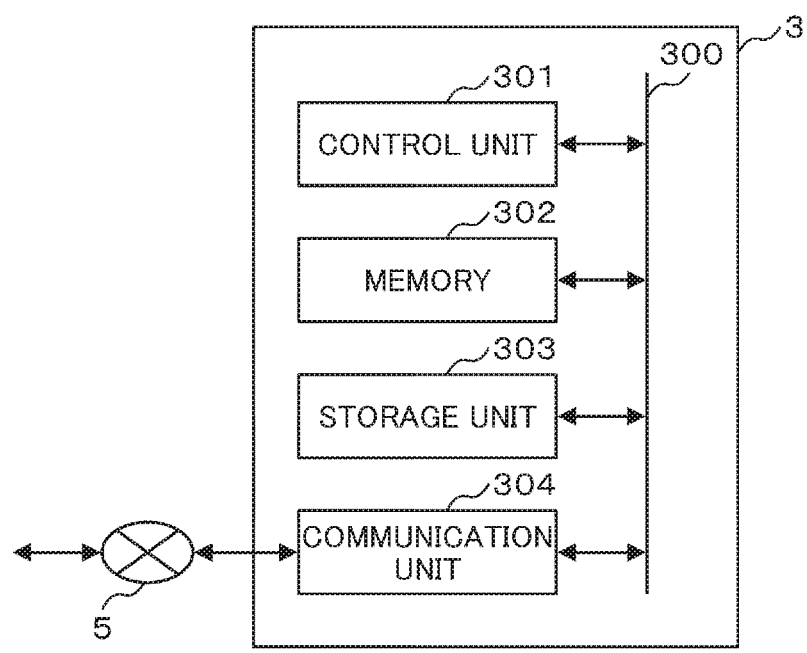

F I G. 4
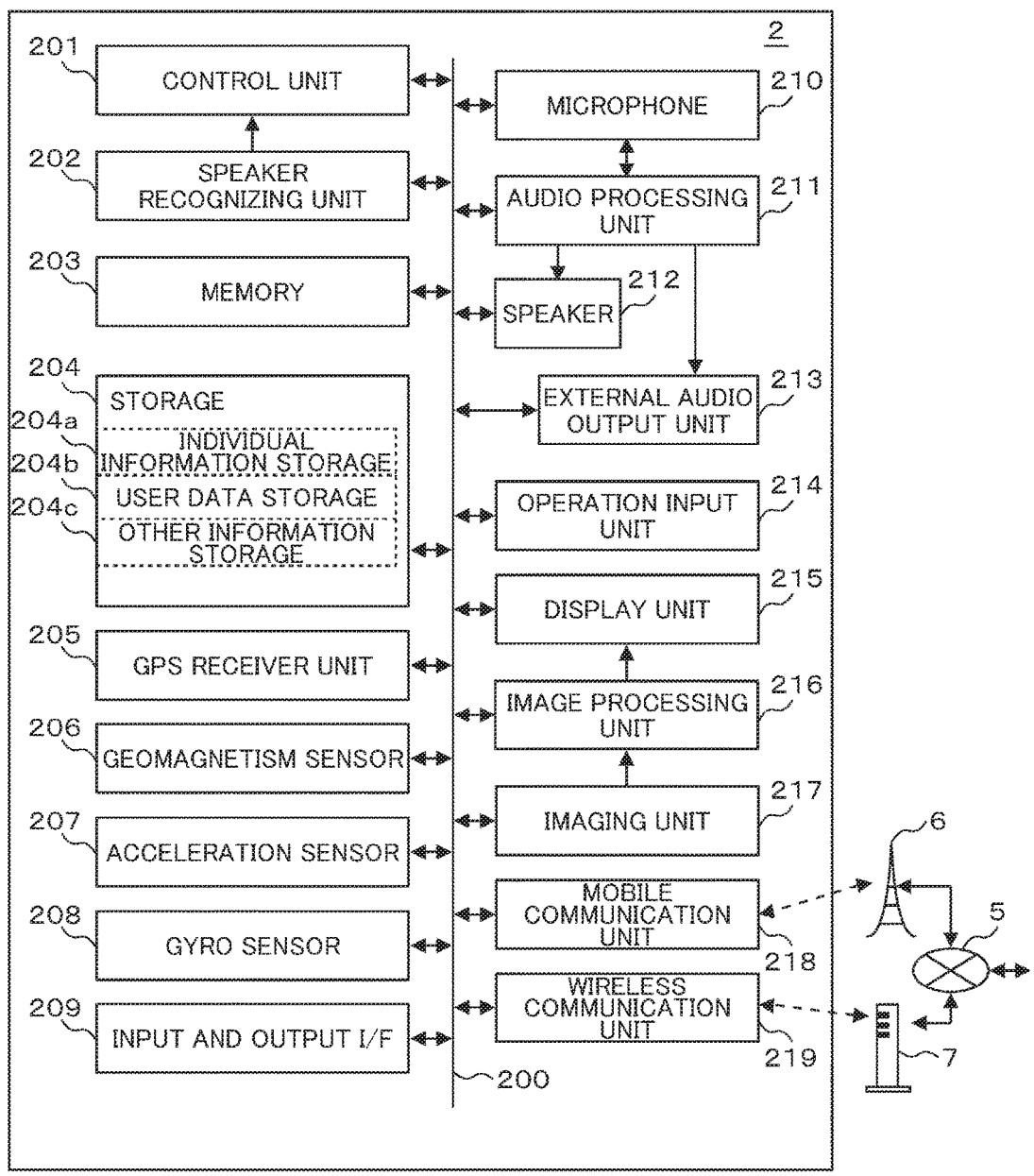

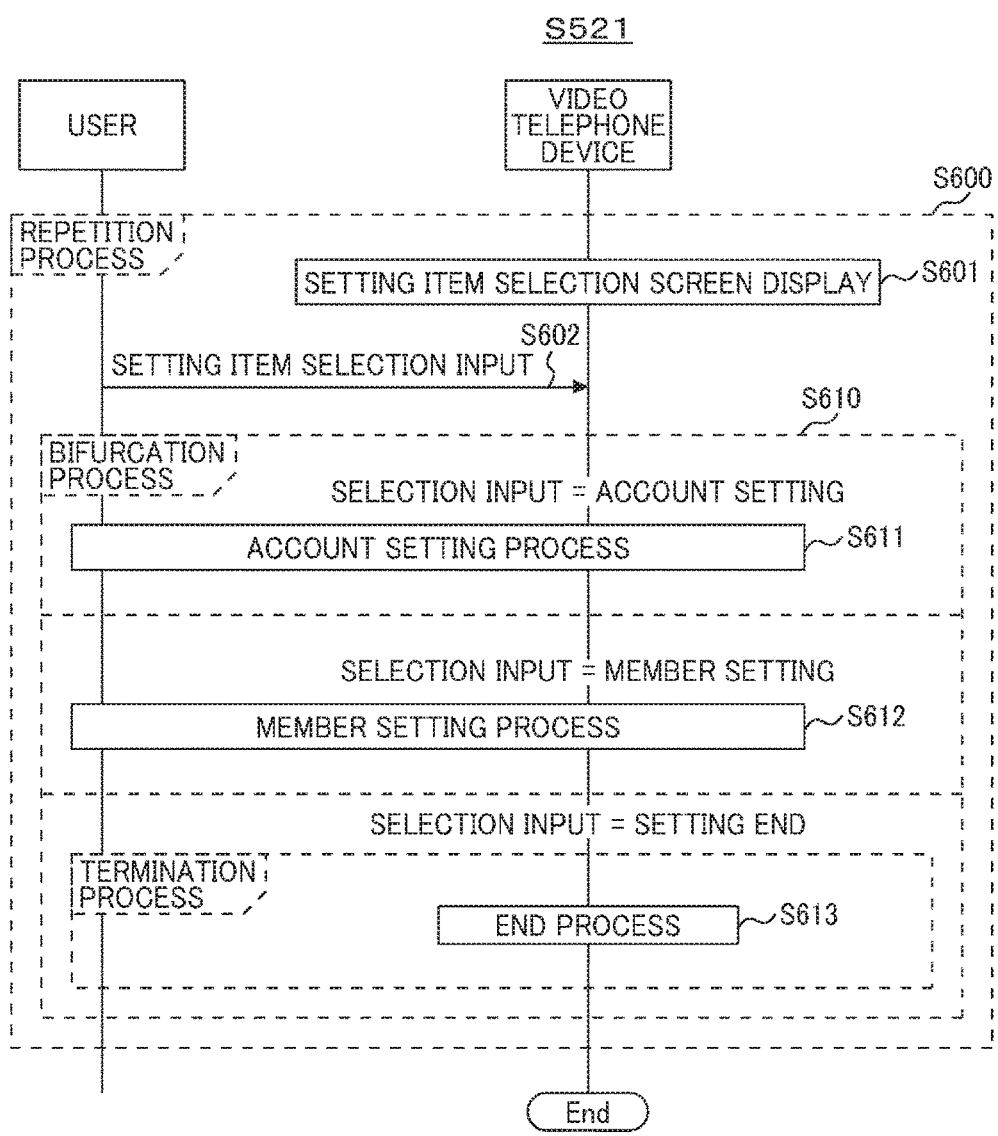
F I G. 6

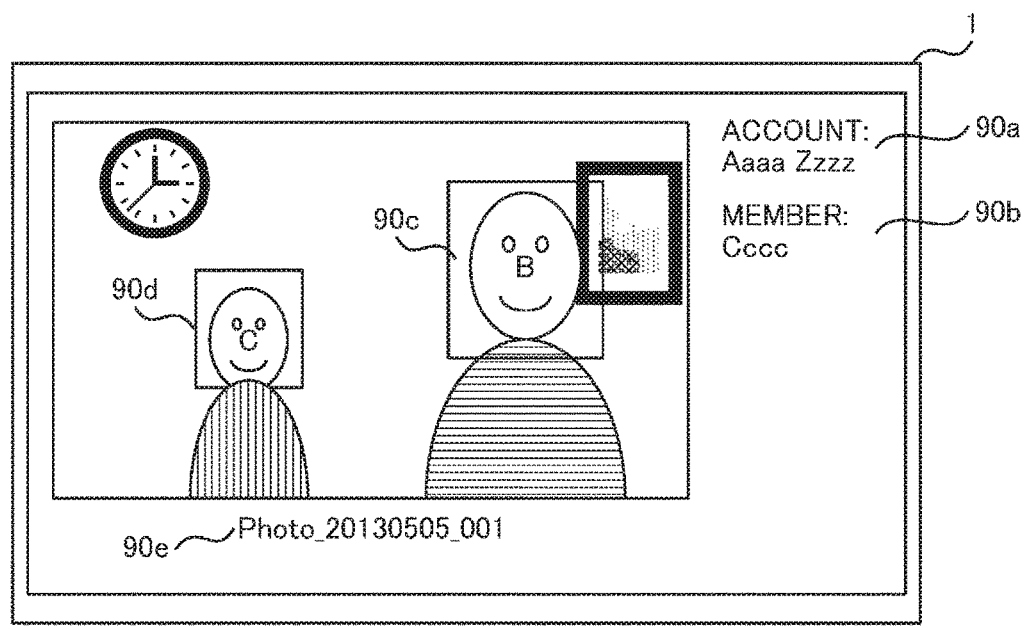
F I G. 9

FIG. 10
| USER ACCOUNT NAME (10a) | MEMBER NAME (10b) | FACE IMAGE (10c) | FACE RECOGNITION DATA (10d) | | |
|---|---|---|---|---|---|
| | | | DATA 1 | DATA 2 | DATA 3 |
| Aaaa Zzzz | Aaaa |  | X1a | X2a | .. |
| | Bbbb |  | X1b | X2b | .. |
| | Cccc |  | X1c | X2c | .. |
| | Dddd | – | – | – | .. |

F I G. 1 4
| CALL DESTINATION ACCOUNT (14a) | MEMBER (14b) | FACE IMAGE (14c) | FACE RECOGNITION DATA (14d) | | |
|---|---|---|---|---|---|
| | | | DATA 1 | DATA 2 | DATA 3 |
| Oooo Yyyy | Oooo |  | X1o | X2o | .. |
| | Pppp |  | X1p | X2p | .. |
| | Qqqq |  | X1q | X2q | .. |
| Sss Xxx | Ssss |  | X1s | X2s | .. |
| | Tttt |  | X1t | X2t | .. |
| .. | .. | .. | .. | .. | .. |

F I G. 1 5

| | CALL DESTINATION ACCOUNT | Oooo Yyyy | | | | Sss Xxx | | | .. |
|---|---|---|---|---|---|---|---|---|---|
| USER ACCOUNT | | NOT DESIGNATED | Oooo | Pppp | Qqqq | NOT DESIGNATED | Ssss | Tttt | .. |
| Aaaa Zzzz | NOT DESIGNATED | A2 | A2 | A2 | A2 | A2 | A2 | A2 | .. |
| | Aaaa | A2 | B1 | B1 | B1 | A2 | A1 | A1 | .. |
| | Bbbb | A2 | D3 | D3 | D3 | A2 | A1 | A1 | .. |
| | Cccc | A2 | B1 | B1 | B2 | A2 | A1 | A1 | .. |
| | Dddd | A2 | D3 | D3 | D3 | A2 | A1 | A1 | .. |

15a | 15b

F I G. 1 6
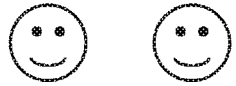

F I G. 2 3
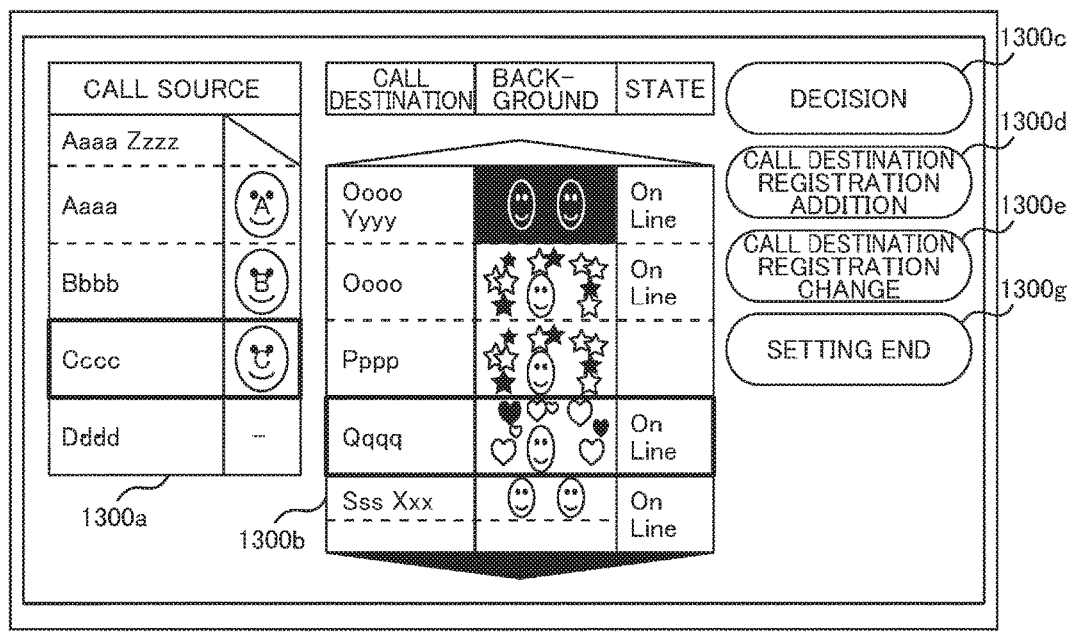

VIDEO TELEPHONE DEVICE AND VIDEO TELEPHONE PROCESSING METHOD

TECHNICAL FIELD

The present invention relates to a video telephone device and a video telephone processing method in which a video call is performed via a network.

BACKGROUND ART

In recent years, with the maintenance expansion of network environments all over the world, Internet protocol (IP) telephony has been spread using an Internet line in addition to a telephone line of a related art. In the IP telephony, users have a conversation with each other by communicating an audio or image signal according to the Internet protocol using a personal computer (PC) connected to the Internet line, a mobile phone with a local area network (LAN) function, or the like.

Among the IP telephony, particularly, a service called a Skype is widely spread across the world, and there are hundreds of millions of registered users. In the beginning, the IP telephony using the Skype supported only a voice call, but as the speed of the network is increased, and terminal devices become high functionality, the IP telephony using the Skype is currently able to perform a video call supporting a high-definition video and thus being used by many people.

In such a video call, since an image imaged by a camera is transmitted to a call counterpart without change, there may be a problem in terms of the user's privacy. For this reason, a technique of extracting a contour of the user from an acquired image and synthesizing a clipped image of the user with a background image was proposed in Patent Document 1. A method of automatically selecting a background image according to an incoming call telephone number was proposed in Patent Document 2.

CITATION LIST

Patent Document

Patent Document 1: JP H4-57582A
Patent Document 2: JP 2005-210191A

SUMMARY OF THE INVENTION

Problems to be Solved by the Invention

The video telephone function according to the IP telephony is provided even in television receiving devices, smartphones, tablet type portable terminal devices, or the like that are used by a plurality of persons as a family. Thus, the methods disclosed in Patent Documents 1 and 2, usability by the user with respect to usage environments or usage situations of the devices is insufficient. For example, in the devices, a family uses the same account when connecting to a server that provides a video telephone function service, and thus there is a problem in that it is difficult to determine who a transmission or reception counterpart in the family is based on only an accounting identifying the user, and it is difficult to select a background suitable for a call counterpart.

The present invention was made in light of the above problem, and it is an object of the present invention to provide a video telephone device and a video telephone processing method in which a video call environment with excellent usability is obtained even when used by a plurality of persons.

Solutions to Problems

As a means for solving the above problem, it is desirable to employ, for example, a configuration set forth in claims.

For example, the present invention provides a video telephone device that communicates image information of an image including an imaged image with another video telephone device via a network, and includes an imaging unit that images the image, an image processing unit that generates image information of an image including the image imaged by the imaging unit, a communication unit that communicates information including the image information generated by the image processing unit with the other video telephone device, a display unit that displays the image information that is generated by the image processing unit and includes the image information generated from the information received from the other video telephone device by the communication unit, an individual information storage unit that stores account information identifying a member of the video telephone device, member information of a plurality of members registered in association with the account information, speaker recognition information for recognizing a speaker using the video telephone device and a speaker using the other video telephone device, and individual setting information according to a combination of the member of the video telephone device and the member of the other video telephone device, a speaker recognizing unit that recognizes the speaker using the video telephone device and the speaker using the other video telephone device based on the speaker recognition information stored in the individual information storage unit, and a control unit that controls operations of the units of the video telephone device such that the image information to be transmitted to the other video telephone device through the communication unit or an image display of the image information to be displayed on the display unit are set based on a recognition result of the speaker recognizing unit and the individual setting information stored in the individual information storage unit.

Further, the present invention provides a video telephone processing method in a video telephone device that communicates image information of an image including an imaged image with another video telephone device via a network, and the video telephone processing method includes a reception step of receiving image information transmitted from the other video telephone device, a recognition step of recognizing a speaker using the other video telephone device when the image information is received in the reception step, an image processing step of generating a synthetic image in which an image of the speaker using the video telephone device is synthesized with a background image based on a recognition result in the recognition step, and a transmission step of transmitting the synthetic image to the other video telephone device.

Further, the present invention provides a video telephone processing method in a video telephone system including a video telephone devices that communicates image information of an image including an imaged image with another video telephone device via a network and a video telephone server that generally controls a plurality of video telephone devices, and the video telephone processing method includes a recognition step of recognizing a speaker using the video telephone device and generating speaker information related to the speaker, a selection step of selecting another video telephone device to communicate with the video telephone device based on the speaker information generated in the recognition step, an acquisition step of acquiring the speaker information related to the speaker using the other video telephone device selected in the selection step, and a transmission step of transmitting the speaker information related to the speaker using the video telephone device to the other video telephone device used by the speaker corresponding to the speaker information acquired in the acquisition step, wherein, in the selection step, another video telephone device that logs in the video telephone server is selected as the video telephone device to communicate.

Effects of the Invention

According to the present invention, there is an effect in which it is possible to provide a video telephone device and a video telephone processing method in which video call environment with excellent usability is obtained even when used by a plurality of persons.

BRIEF DESCRIPTION OF THE DRAWINGS

FIG. 1 is a block configuration diagram illustrating a video telephone system according to an embodiment.

FIG. 2 is a block diagram illustrating an exemplary configuration of a video telephone server 3.

FIG. 4 is a block diagram illustrating an exemplary configuration of a terminal device.

FIG. 6 is a sequence diagram illustrating an example of a user setting process.

FIG. 9 is a diagram illustrating an example of a display of a television receiving device at the time of a new member registration process.

FIG. 10 is a diagram illustrating an example of information registered in association with a user account.

FIG. 14 is a diagram illustrating an example of information registered in association with a call destination account.

FIG. 15 is a diagram illustrating an example of setting data of a background for a call destination corresponding to a call source.

FIG. 16 is a diagram illustrating an example of background setting data.

FIG. 23 is a diagram illustrating an example of a display of a television receiving device in a call destination selection process.

MODE FOR CARRYING OUT THE INVENTION

Figure 3:
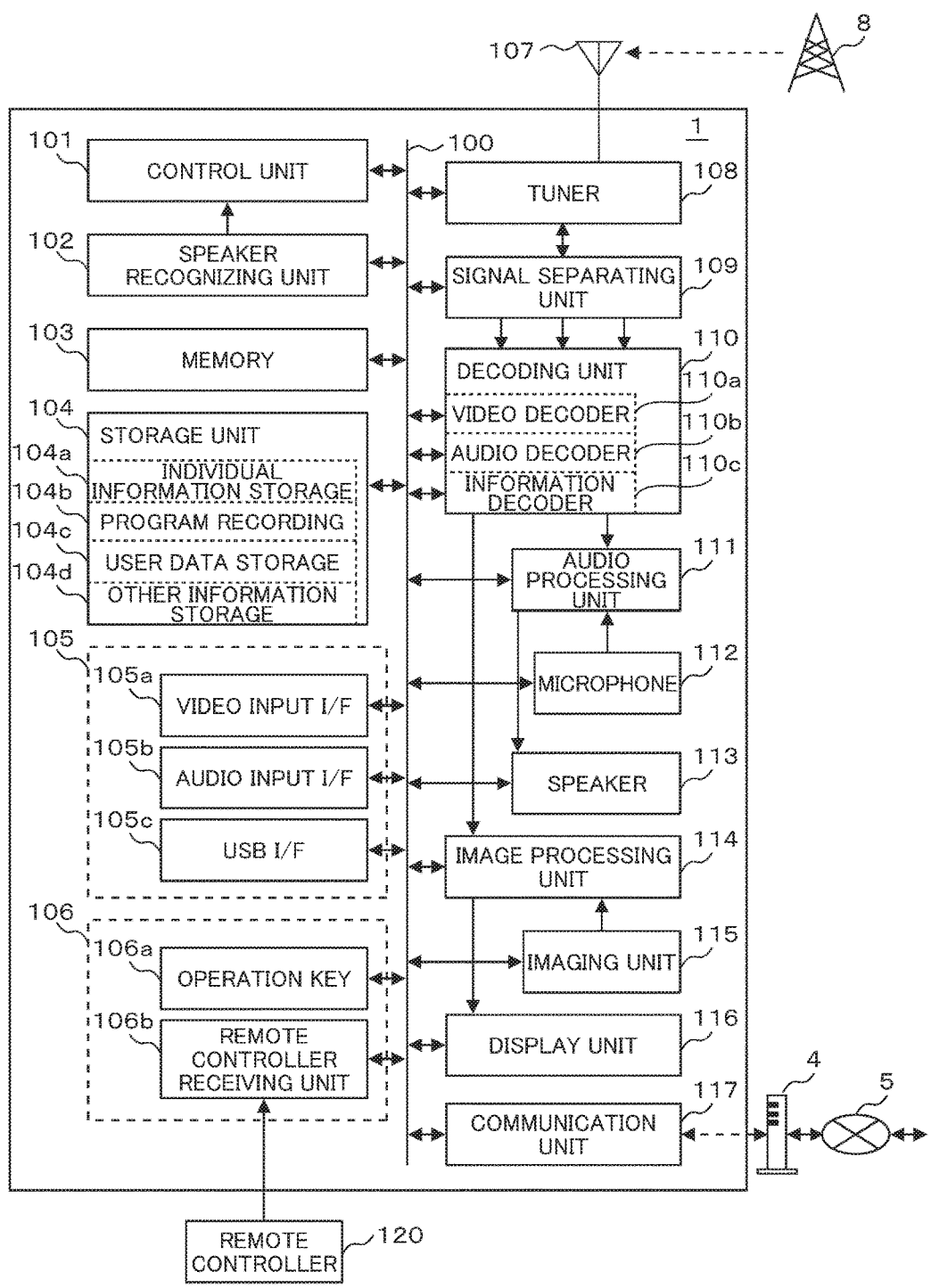
FIG. 3 is a block diagram illustrating an exemplary configuration of a television receiving device.

Hereinafter, an embodiment of the present invention will be described with reference to the appended drawings.

FIG. 1 is a block configuration diagram illustrating an example of a video telephone system according to an embodiment of the present invention. In the present embodiment, a video telephone device is a video telephone system using a television receiving device 1 and a terminal device 2, and includes a video telephone server 3, a router 4, an external network 5, a base station 6, and a router 7.

The routers 4 and 7 have a wireless LAN function or a wired LAN function according to a Wi-Fi standard such as IEEE 802.11a/b/n and are connected to the external network 5 via a communication line.

The television receiving device 1 is connected with the router 4 via a wireless LAN or a wired LAN and connected with the video telephone server 3 and via the router 4 and the external network 5, and performs a video call based on the IP telephony.

The terminal device 2 is connected with the router 7 via a wireless LAN or a wired LAN and connected with the video telephone server 3 via the router 7 and the external network 5, and performs a video call based on the IP telephony. Further, the terminal device 2 is connected with video telephone server 3 via the base station 6 and the external network 5 through far-field wireless communication such as wideband code division multiple access (WCDMA) or global system for mobile communications (GSM) (a registered trademark), and can perform a video call based on the IP telephony.

[Hardware Configuration of Video Telephone Server]

FIG. 2 is a block diagram illustrating an exemplary configuration of the video telephone server 3 according to the embodiment of the present invention.

Referring to FIG. 2, the video telephone server 3 includes a control unit 301, a memory 302, a storage unit 303, and a communication unit 304 which are connected with one another via a bus 300. The control unit 301 is configured with a central processing unit (CPU) or the like, and controls the components such that various kinds of processes are performed as a program stored in the memory 302 is executed. The storage unit 303 stores user information such as information for authenticating an account of the user. The communication unit 304 is an interface for a connection with the external network 5, and transmits information such as a login state of the user to the video telephone server 3 to the television receiving device 1, the terminal device 2, or the like corresponding to a network connection via the external network 5 and the base station 6 or the router 4 or 7.

[Hardware Configuration of Television Receiving Device]

FIG. 3 is a block diagram illustrating an exemplary configuration of the television receiving device 1 according to the embodiment of the present invention.

Referring to FIG. 3, a control unit 101 is configured with a CPU or the like, and controls the entire television receiving device 1 according to an operating system stored in the memory 103, various kinds of application programs, or the like. A system bus 100 is a data communication path in which data is transmitted and received between the control unit 101 and the components of the television receiving device 1. A speaker recognizing unit 102 recognizes a speaker based on a video of a user of a call source acquired from an imaging unit 115 through an image processing unit 114 and a video of a counterpart of a call destination acquired through a communication unit 117, the router 4, and the external network 5.

The storage unit 104 includes an individual information storage region 104a that stores, for example, information related to the user of the television receiving device 1, a program recording region 104b that stores recording data of a digital broadcast program and information (reservation information and the like) related to recording data of a digital broadcast program, a user data storage region 104c that stores user data such as data of music/video/photograph, and the other information storage region 104d. The individual information storage region 104a stores information of an account of the user connected to the server that provides the video call service, a face image of the user of the call source used by the speaker recognizing unit 102, information used to recognize a face of the counterpart of the call destination, data such as a background image at the time of a video call, and the like.

The television receiving device 1 can extend its function by downloading a new application via the communication unit 117, the router 4, and the external network 5. At this time, the downloaded new application is stored in the other information storage region 104d. As the new application stored in the other information storage region 104d is deployed onto the memory 103 and executed, the television receiving device 1 can implement various kinds of new functions.

An external interface 105 is a group of interfaces for extending the function of the television receiving device 1, and includes a video input I/F 105a, an audio input I/F 105b, and a universal serial bus (USB) interface 105c in the present embodiment. The video input I/F 105a and the audio input I/F 105b receive a video signal and an audio signal from an external video/audio output device. A USB interface 105c performs, for example, a connection of a type of a USB device such as a keyboard or a memory card. When the television receiving device 1 records a digital broadcast program in a hard disc drive (HDD) or the like connected to the outside, the HDD device or the like is preferably connected to the USB interface 105c. The video input I/F 105a and the audio input I/F 105b may receive a video and an audio together using a high-definition multimedia interface (HDMI) (a registered trademark).

An operation unit 106 is an instruction input unit that inputs an operation instruction to the television receiving device 1, and includes an operation key 106a in which button switches are arranged and a remote controller receiving unit 106b that receives an infrared signal from a remote controller 120 in the present embodiment. The television receiving device 1 may be operated, for example, using a keyboard connected to the USB interface 105c. Further, the television receiving device 1 may be operated using a portable device connected via the communication unit 117, any other PC, or the like.

A tuner 108 extracts a signal of a channel selected by the user of the television receiving device 1 from a broadcast wave received by an antenna 107, and demodulates a transport stream (TS) signal. A signal separating unit 109 separates the TS signal into video data, audio data, and incidental information data which are packetized, and outputs the video data, the audio data, and the incidental information to a decoding unit 110. Here, the video data is output to a video decoder 110a, the audio data is an audio decoder 110b, and the incidental information data is output to an information decoder 110c. The video decoder 110a decodes the video data output from the signal separating unit 109, and outputs a video signal to the image processing unit 114. The audio decoder 110b decodes the audio data output from the signal separating unit 109, and outputs an audio signal to an audio processing unit 111. The information decoder 110c processes the incidental information data output from the signal separating unit 109, and acquires, particularly, service information (SI) including program information such as a program name, a genre, and a broadcasting start/end date and time of each program.

A display unit 116 is a display device such as a liquid crystal panel, and displays a video signal processed by the image processing unit 114. The image processing unit 114 performs format conversion, superimpose processing of a menu or any other on screen display (OSD) signal, a synthesis process of synthesizing an image of a speaker input from the imaging unit in a video call and a background image stored in the individual information storage region 104a, or the like on the input video signal as necessary. A speaker 113 outputs the audio signal processed by the audio processing unit 111.

The imaging unit 115 is a camera or the like, and acquires a video of a speaker at the time of a video call and outputs the acquired video to the image processing unit. The image processing unit 114 generates image information based on the video. A microphone 112 acquires an external voice and outputs the acquired voice to the audio processing unit 111 and is used for a video call or the like.

The communication unit 117 is connected with the router 4 via a wired LAN or a wireless LAN, and performs transmission and reception of information or a video call based on communication of an audio or image signal according to the Internet protocol with the external network 5 such as the Internet.

In the above description, the imaging unit 115 and the microphone 112 are configured to be installed in the television receiving device 1, but a camera or a microphone installed outside may be used with the intervention of the USB interface 105c.

[Hardware Configuration of Terminal Device]

FIG. 4 is a block diagram illustrating an exemplary configuration of the terminal device 2 according to the embodiment of the present invention.

Here, a smartphone is described as an example of the terminal device 2. The terminal device 2 includes a control unit 201, a speaker recognizing unit 202, a memory 203, a storage unit 204, a global positioning system (GPS) receiver unit 205, a geomagnetism sensor 206, an acceleration sensor 207, a gyro sensor 208, an input and output I/F 209, a microphone 210, an audio processing unit 211, a speaker 212, an external audio output unit 213, an operation input unit 214, a display unit 215, an image processing unit 216, an imaging unit 217, a mobile communication unit 218, and a wireless communication unit 219 which are connected with one another via a bus 200.

The control unit 201 is configured with a CPU or the like, and controls the components such that various kinds of processes are performed as an operating system or various kinds of application programs stored in the memory 203 are executed. The speaker recognizing unit 202 recognizes a speaker based on a video of the user of the call source acquired from the imaging unit 217 through the image processing unit 216 and a video of the counterpart of the call destination that performs a video call and is obtained through a connection with the external network 5 via the mobile communication unit 218, the base station 6 or the wireless communication unit 219, or the router 7.

The storage unit 204 includes an individual information storage region 204a that stores, for example, information related to the user, a user data storage region 204b that stores the user data such as data of music, videos, and photographs, and the other information storage region 204c. The individual information storage region 204a stores information of an account of the user connected to the server that provides the video call service, a face image of the user of the call source used by the speaker recognizing unit 102, information used to recognize a face of the counterpart of the call destination, data such as a background image at the time of a video call, and the like.

The GPS receiver unit 205 receives signals from GPS satellites in the sky. A current position of the terminal device 2 is detected based on the signals. The geomagnetism sensor 206 is a sensor that detects a direction in which the terminal device 2 is headed. The acceleration sensor 207 is a sensor that detects acceleration of the terminal device 2, and the gyro sensor 208 is a sensor that detects an angular velocity of the terminal device 2. Through the sensors, an inclination and a motion of the terminal device 2 are detected in detail.

The input and output I/F 209 is configured with, for example, a USB, and functions as an interface that performs transmission and reception of data with an external device (not illustrated).

The microphone 210 receives an external sound, and the speaker 212 outputs a sound to the outside. The external audio output unit 213 is connected to an earphone (not illustrated) and outputs a sound. An input sound undergoes audio processing performed by the audio processing unit 211.

The operation input unit 214 is, for example, a touch pad type of an input unit such as a capacitive touch pad, and detects an operation of the user using a contact operation (hereinafter, referred to as a "touch") by a finger or a touch pen as an operation input. The display unit 215 displays a video or an image on a liquid crystal panel, and the operation input unit 214 is arranged on a display surface of the display unit 215.

The imaging unit 217 is configured with a camera or the like. A video displayed on the display unit 215 or a video input from the imaging unit 217 is processed through the image processing unit 216, and an input video signal undergoes format conversion, a synthesis process of synthesizing the image of the speaker input from the imaging unit 217 during a video call and the background image stored in the individual information storage region 204a, or the like as necessary.

The mobile communication unit 218 is a communication interface that performs far-field wireless communication with the base station 6 according to W-CDMA, GSM, or the like. The wireless communication unit 219 is a communication interface that performs wireless communication with the router 4 according to a wireless LAN. Thus, the terminal device 2 can be connected to the external network 5 via the base station 6 or the router 7 and perform transmission and reception of information, a video call based on communication of an audio or image signal according to the Internet protocol, and the like.

The mobile communication unit 218 or the wireless communication unit 219 is connected to the external network 5 via the base station 6 or the router 7. Thus, a program or data stored in the memory 203 or the storage unit 204 is downloaded from an external server (not illustrated) and updated or added as necessary. Further, as the input and output I/F 209 is connected to an external device such as a PC, data, a program, or the like can be updated or added.

Next, an exemplary operation of a video call process will be described.

[Example of Video Call Process]

Figure 5:
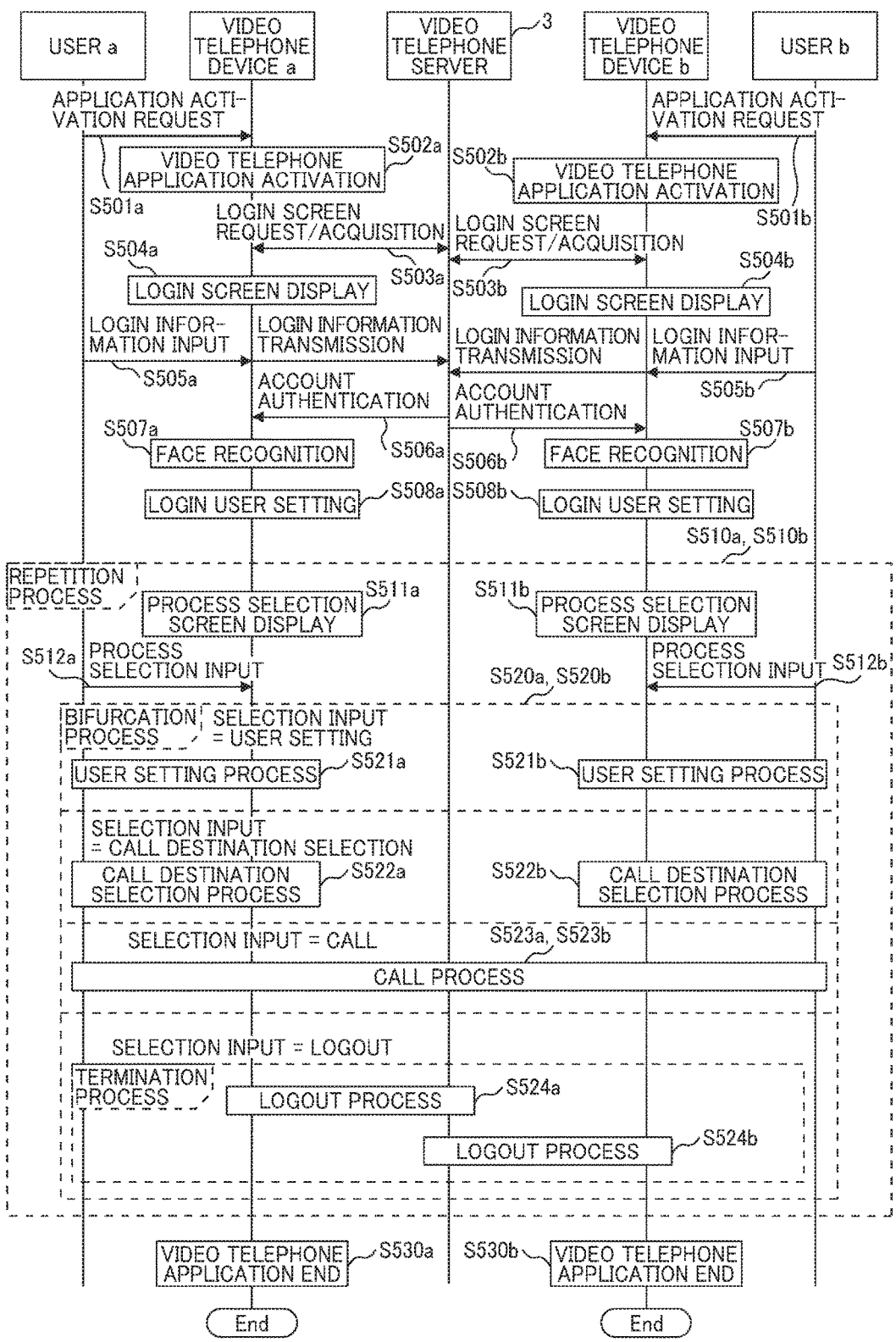
FIG. 5 is a sequence diagram illustrating an example of a video call process.

FIG. 5 is a sequence diagram illustrating an example of a video call process according to the embodiment of the present invention, that is, is a sequence diagram illustrating an example of a process when a user a of a video telephone device a performs a video call with a user b of a video telephone device b (another video telephone device). Here, the video telephone device is a device capable of performing a video call such as the television receiving device 1 or the terminal device 2.

The user a of the video telephone device a and the user b of the video telephone device b select a video call application from a menu screen and make an activation request (S501a and S501b). As a result, the video telephone device a and the video telephone device b activate the video call application (S502a and S502b), access the video telephone server 3, requests login screen information, and acquire the login screen information (S503a and S503b).

Then, the video telephone device a and the video telephone device b display a login screen (S504a and S504b), and when the user a and the user b input a user account and a password (S505a and S505b), login information of the input user account and the password is transmitted from the video telephone devices to the video telephone server 3.

The video telephone server 3 authenticates the user account when the user is determined to be a legitimate registered user with reference to the user information accumulated in the storage unit 303 (S506a and S506b). Then, the video telephone device a and the video telephone device b perform a face recognition process based on the image of the user input from the imaging unit 115 or 217 (S507a and S507b).

When the face recognized by the face recognition process is identical to a face of a member of an account that has been registered in advance, a registered member name is set as a logged-in user. Here, a member means one or more users who are registered in the video telephone device a and able to perform a call using the video telephone device a (or who are allowed to perform a call or have a right to perform a call). When a plurality of members are recognized through the face recognition process, a plurality of member names may be set as the user, a member name selected from a list of recognized members being displayed by one of the users may be set as the logged-in user, or an account name may be set as the logged-in user without designation of a member. Further, when it is hard to identify two persons such as twins, a list of candidates may be displayed, and a member name selected from the list by the user may be set as the logged-in user.

When the face recognized by the face recognition process is not identical to the face of the member of the account that has been registered in advance, a new account name is set as the logged-in user (S508a and S508b). The new account name may be set by the logged-in user or the video telephone device. Further, a set member may be set as the user by performing a member setting process of S612 of FIG. 6 which will be described later.

One of a family that owns the video telephone device registers each family member, for example, the image of the face imaged by the imaging unit 115 or 217 and the member name in the individual information storage unit 104a or 204a of the video telephone device. When the user logs in, in the face recognition process of S507a and S507b, it is determined whether or not the image obtained by imaging the face of the user through the imaging unit 115 or 217 is identical to any one of images of faces registered in the individual information storage unit 104a or 204a. As will be described in detail below, it is decided whether or not, for example, a background image for a current image imaged by the imaging unit 115 or 217 is transmitted to a call destination based on the determination result. Thus, even when a plurality of persons including the user other than the family use the video telephone device, the video call environment with excellent usability is provided.

Then, the video telephone device a and the video telephone device b performs a repetition process of S510a and S510b until the user selects "logout." In the repetition process of S510a and S510b, first, a selection screen of a process executed by the video telephone device a and the video telephone device b is displayed (S511a and S511b). When the selection result is input from the user (S512a and S512b), the video telephone device a and the video telephone device b execute a bifurcation process of S520a and S520b according to the selection result. A user setting process of S521a and S521b is executed when the user selects "user setting," a call destination selection process of S522a and S522b is executed when the user selects "call destination selection," and a call process of S523a and S523b is executed when the user selects "call." When "logout" is selected, a logout process of S524a and S524b is executed, the repetition process of S510a and S510b (S530a and S530b) stops, and the video call application ends.

Next, the user setting process of S521a and S521b of FIG. 5, the call destination selection process of S522a and S522b, and the call process of S523a and S523b will sequentially be described in detail with reference to sequence diagrams of FIGS. 6 to 8, sequence diagrams of FIGS. 11 and 12, and sequence diagrams of FIGS. 17 to 21, respectively. First, the user setting process of S521a and S521b will be described.

FIG. 6 is a sequence diagram illustrating an example of the user setting process of S521 according to the embodiment of the present invention.

In the user setting process, a repetition process of S600 is performed until the user selects "setting end." In the repetition process of S600, first, the video telephone device displays a screen for selecting an item for a user setting (S601). When the user inputs a setting item selection result (S602), the video telephone device executes a bifurcation process of S610 according to the selection result. When the user selects "account setting," a setting process of S611 of account information for logging in the video telephone server 3 is executed, and when the user selects "member setting," a process of S612 of setting a members who performs a video call using the same account is executed. When the user selects "setting end," an end process of S613 is executed, the repetition process of S600 stops, and the user setting process ends.

Figure 7:
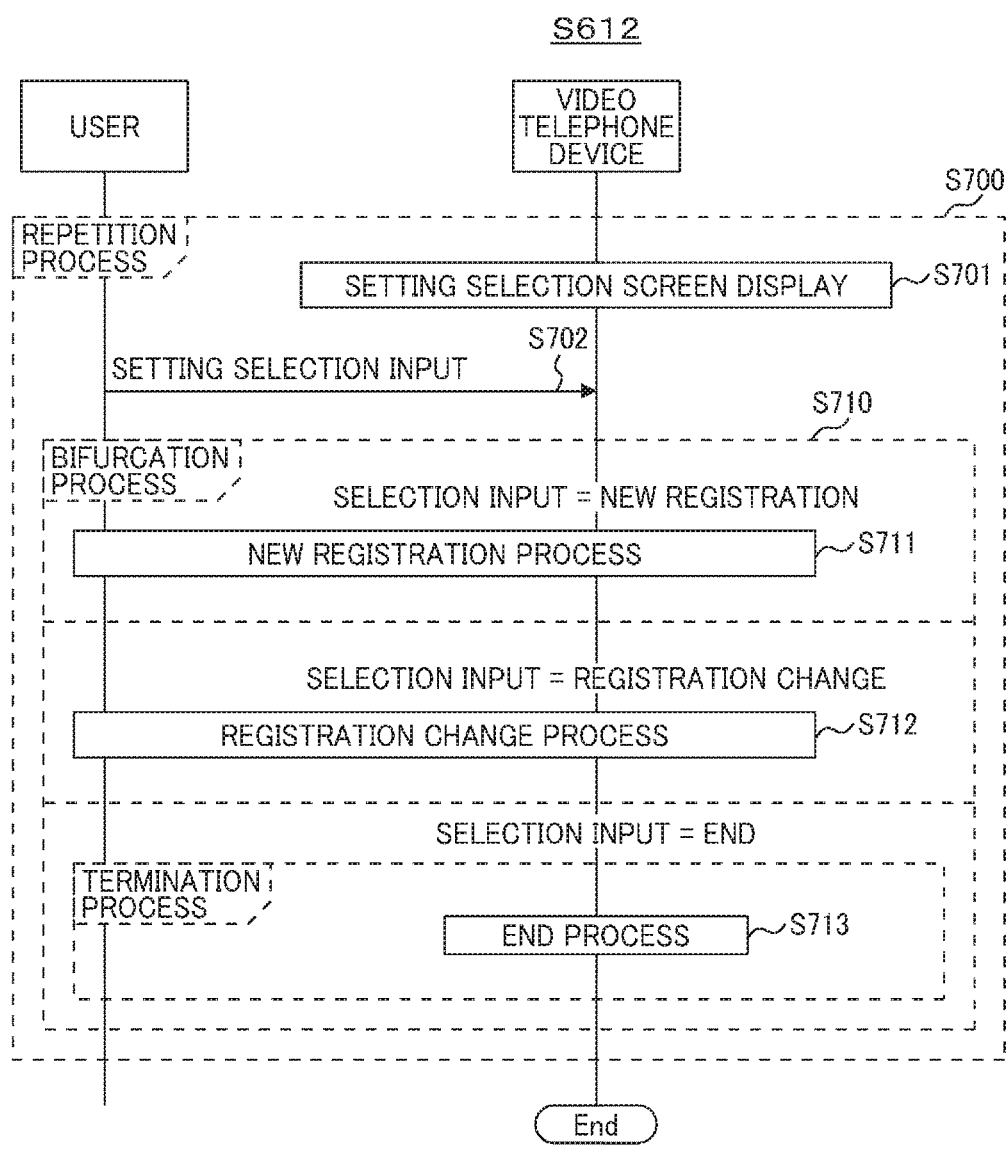
FIG. 7 is a sequence diagram illustrating an example of a member setting process.

FIG. 7 is a sequence diagram illustrating an example of the member setting process of S612 according to the embodiment of the present invention.

In the member setting process, a repetition process of S700 is performed until the user selects "setting end." In the repetition process of S700, first, a screen for selecting an item for a user setting in a video call is displayed (S701).

When the user inputs a setting item selection result (S702), the video telephone device executes a bifurcation process of S710 according to the selection result. When the user selects "new registration," a process of S711 of newly registering a member who performs a video call using the same account is executed, and when "registration change" is selected, a process of S712 of changing registration content of an already registered member is executed. When "setting end" is selected, an end process of S713 is executed, the repetition process of S700 stops, and a member setting process ends.

Figure 8:
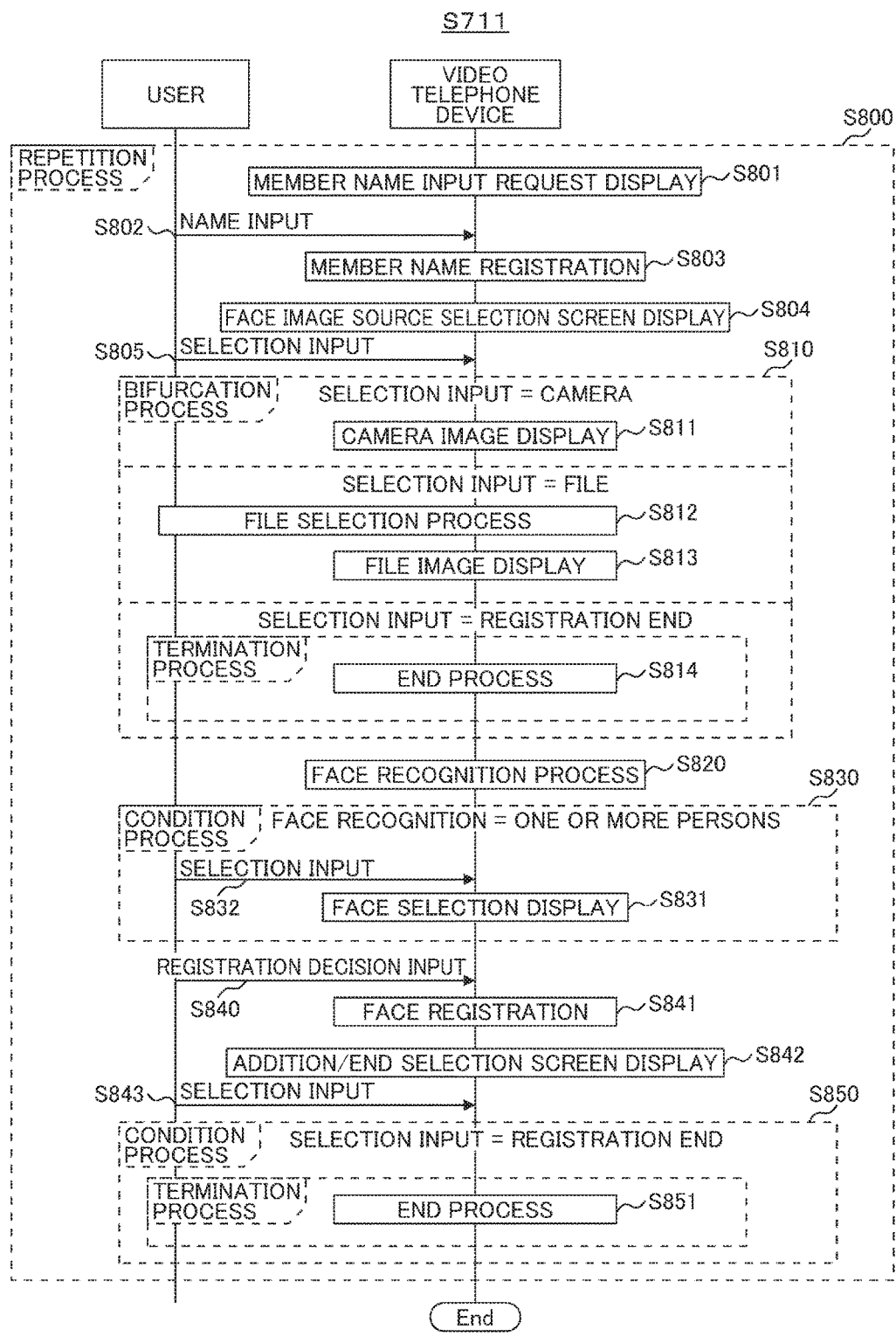
FIG. 8 is a sequence diagram illustrating an example of a new member registration process.

FIG. 8 is a sequence diagram illustrating an example of the new member registration process of S711 according to the embodiment of the present invention.

In the new registration process, the repetition process of S800 is performed until the user selects "registration end" in a selection input process of S805 or S842. In the repetition process of S800, first, a screen of requesting an input of a name of a member to be newly registered is displayed (S801). When the user inputs the name (S802), the input name is registered as a member of the logged-in account (S803). Then, a screen for selecting a face image source for registering a face image used for face recognition of a registered member is displayed (S804). When the user inputs a selection result (S805), the video telephone device executes a bifurcation process of S810 according to the selection result. When the user selects "camera," for example, the television receiving device 1 causes the image input from the imaging unit 115 to be displayed on the display unit 116, and the terminal device 2 causes the image input from the imaging unit 217 to be displayed on the display unit 215 (S811). When "file" is selected, for example, a process of S812 of selecting an image file of a photograph or a video stored in the user data storage region 104c of the storage unit 104 in the television receiving device 1 or selecting an image file of a photograph or a video stored in the user data storage region 204b of the storage unit 204 in the terminal device 2, and the selected image is displayed on the display unit 115 of the television receiving device 1 or the display unit 215 of the terminal device (S813). Further, when "registration end" is selected, an end process of S814 is performed without registering a face image, the repetition process of S800 stops, and the new registration process ends.

When "camera" or "file" is selected in the selection process of S810, a face recognition process (S820) is performed on the image displayed on the display unit, and a condition process of S830 according to the recognition result is performed. When one or more faces are recognized in the condition process of S830, the display unit displays a screen for selecting a face of a member to be registered (S831), and the user selects a face to be registered (S832). Then, when a face of one person is registered by a registration decision input (S840) from the user, the recognized face is registered in association with a member name, and when faces of one or more persons are recognized, a selected face is registered in association with a member name (S841). The display unit displays a screen for selecting whether a member is further registered or the registration process ends (S842). When the user inputs a selection result (S843), the video telephone device executes a condition process of S850 according to the selection result. In the condition process of S850, when "registration end" is selected, an end process of S851 is performed, the repetition process of S800 stops, and the new registration process ends. When "addition registration" is selected, registration of a new member is continuously performed by the repetition process of S800.

FIG. 9 illustrates an example of a display of the television receiving device 1 at the time of the new member registration process.

An example of FIG. 9 is an example in which "file" is selected in the selection process of S810, and the face recognition is performed on the photograph stored in the user data storage region 104c. A logged-in account name is displayed as indicated by 90a, a member name to be registered is displayed as indicated by 90b. Further, a file name of a selected is displayed as indicated by 90e. A plurality of frames 90c and 90d indicating a recognized face are displayed, and a thick frame is displayed as the frame 90d selected as a face to be registered. Here, for example, when the user pushes a predetermined button of the remote controller 120, a registration decision input is performed, and face recognition information corresponding to a member name is registered in the individual information storage region 104a. When the face recognition is performed based on the image file of the video (moving image), it is desirable to perform the face recognition in a stationary state at a point in time at which the face of the member to be registered is shown in terms of the accuracy of the face recognition.

FIG. 10 illustrates an example of information registered in the individual information storage region 104a in association with the user account. A member name 10b corresponding to a user account name 10a, a registered face image data 10c, and face recognition data 10d for recognizing a face of each member are registered. As the face recognition data 10d, for example, data obtained by numericalizing features of a face such as a positional relation of eyes and a nose is used.

Next, the call destination selection process of S522 in FIG. 5 will be described.

Figure 11:
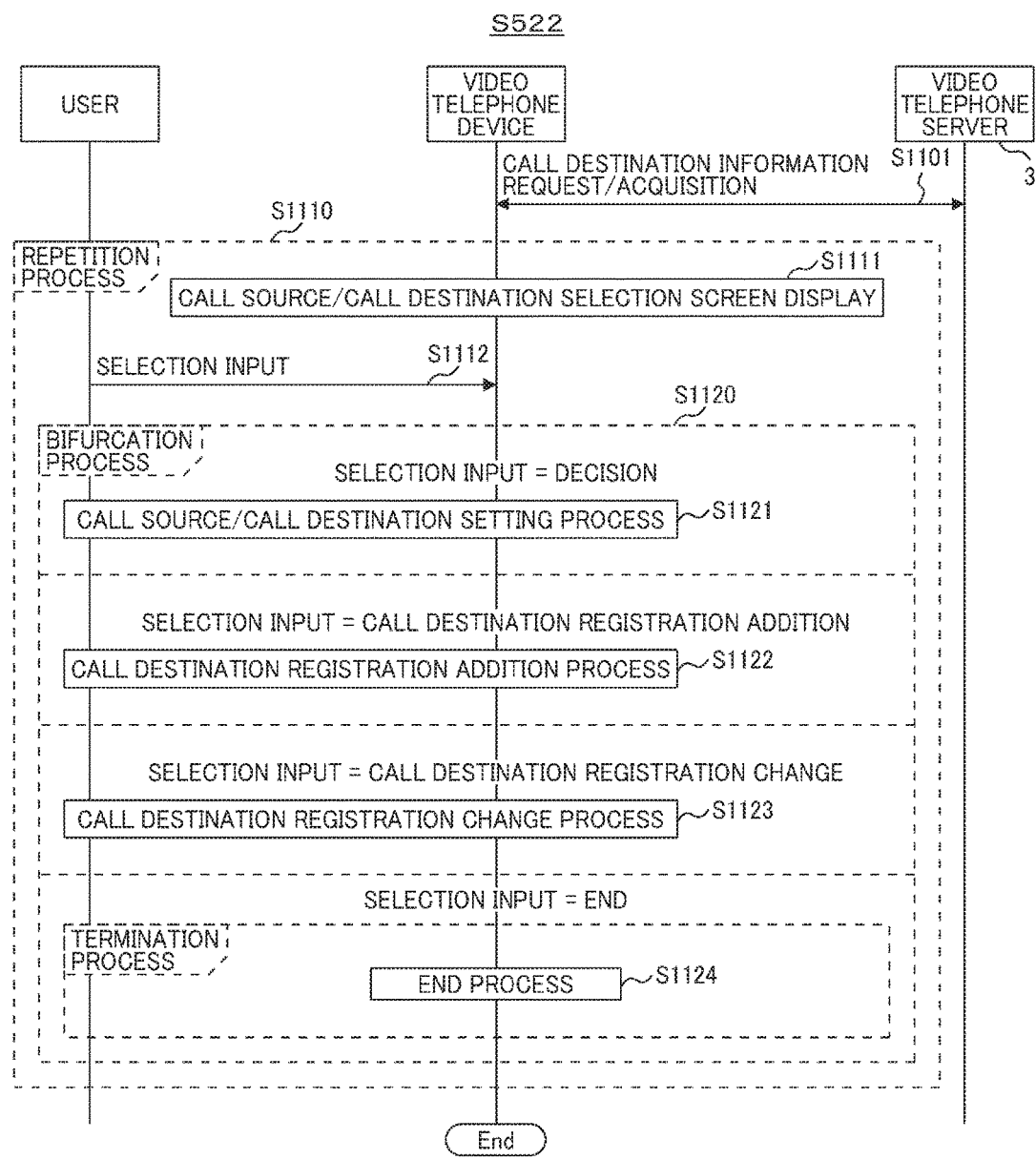
FIG. 11 is a sequence diagram illustrating an example of a call destination selection process.

FIG. 11 is a sequence diagram illustrating an example of the call destination selection process of S522 according to the embodiment of the present invention.

In the call destination selection process of S522, first, video telephone device accesses the video telephone server 3 via the external network 5, requests information indicating whether or not an account registered as a call destination logs in the video telephone server 3, IP address information of the video telephone device of the logged-in account, information indicating whether or not the logged-in account is on a call, and acquires the information (S1101). Then, a repetition process of S1110 is performed until the user selects "end" in a selection input process of S1112. In the repetition process of S1110, first, a screen for selecting a call source and a call destination is displayed (S1111). Then, a bifurcation process of S1120 is performed according to a selection process of S1112 of the user. A call source/call destination setting process of S1121 is performed when "decision" is selected in the selection process of S1112, a process of S1122 of registering an account of a new call destination is performed when "call destination registration addition" is selected, and a process of S1123 of changing information of an already registered account is performed when "call destination registration change" is selected.

Figure 12:
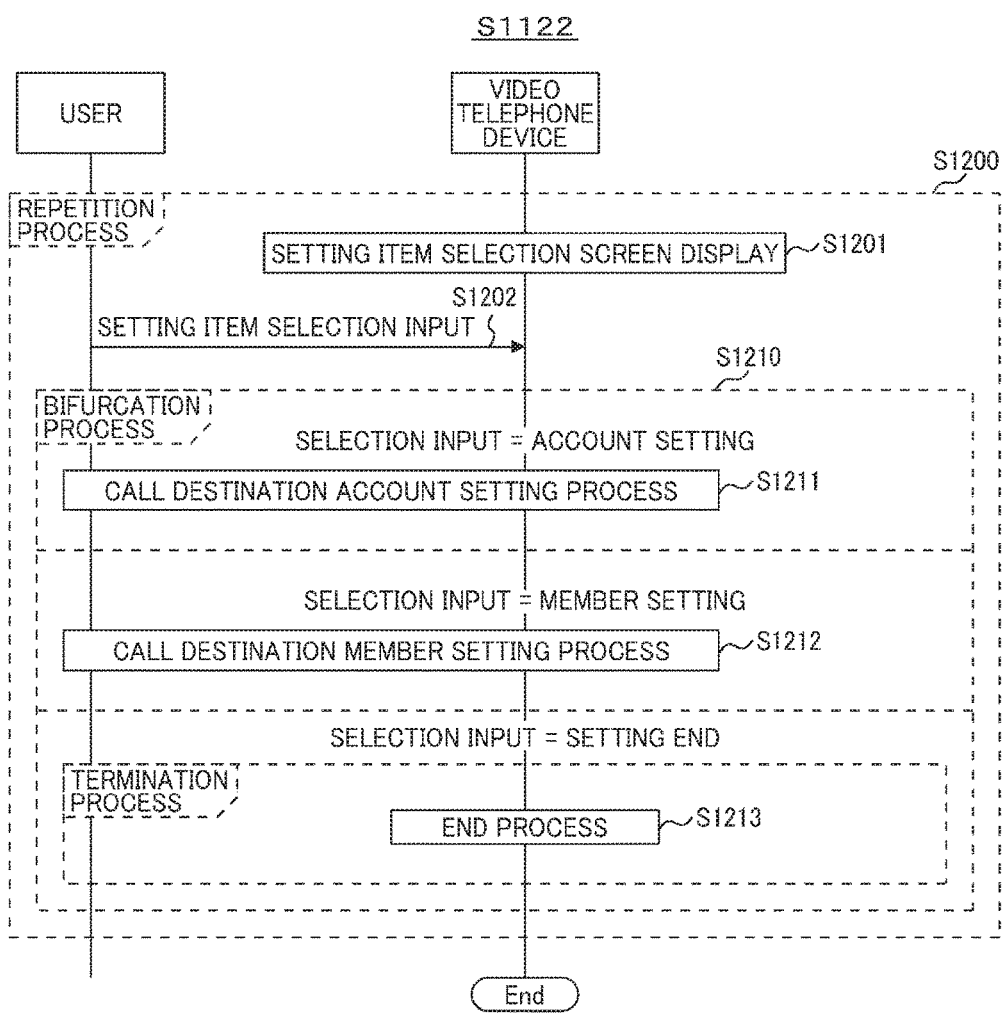
FIG. 12 is a sequence diagram illustrating an example of a call destination addition registration process.

FIG. 12 is a sequence diagram illustrating an example of the call destination addition registration process of S1122 according to the embodiment of the present invention.

In the call destination addition registration process, first, a repetition process of S1200 is performed until the user selects "setting end." In the repetition process of S1200, first, the video telephone device displays a screen in which the user selects an item to be set (S1201). Here, the video telephone device is a device capable of performing a video call such as the television receiving device 1 or the terminal device 2. When the user inputs a setting item selection result (S1202), the video telephone device executes a bifurcation process of S1210 according to the selection result. A process of S1211 of setting information of a name of an account of a call destination is executed when the user selects "account setting," and a process of S1212 of setting a member who performs a call using the account of the call destination is executed. When "setting end" is selected, an end process of S1213 is executed, the repetition process of S1200 stops, and the user setting process ends.

Figure 13:
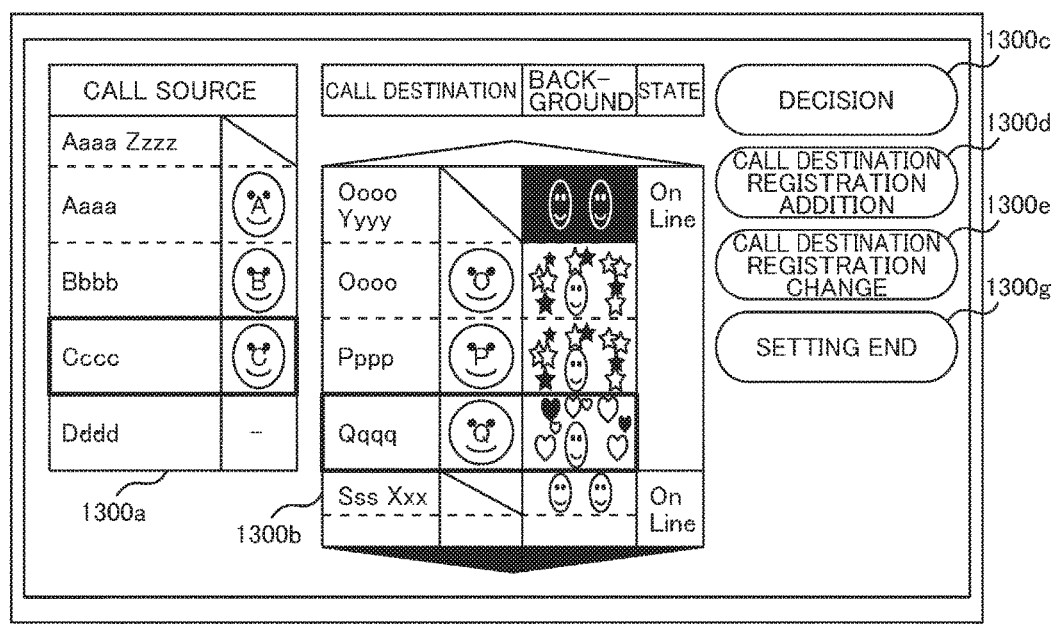
FIG. 13 is a diagram illustrating an example of a display of a television receiving device in a call destination selection process.

FIG. 13 illustrates an example of a display of the television receiving device 1 in the call destination selection process of S522.

Referring to FIG. 13, an account of a call source and a name and a face image of a member registered in an account are displayed as indicated by 1300a, and a thick frame is displayed as a display frame of a member selected as a call source. For example, a member whose face is recognized in the face recognition process of S507 and that is set in the login user setting process of S508 is selected as a call source. In this case, the selection is performed as initial section based on the login user setting process of S508, but it is possible to change the selection, and even when there is a mistake in the user setting in the login user setting process of S508 due to an error in the face recognition, it is possible to set a member of a correct call source by changing the selection. Further, it is also possible to set only the user account without designation of a specific member.

Further, an account of a call destination, a name and a face image of a member registered in the account, a setting of a background to a selected call destination, a state (On Line/Off Line) indicating whether or not the account of the call destination logs in the video telephone server 3, and the like are displayed as indicated by 1300b. A thick frame is displayed as a display frame of a member selected as a call destination. Further, a button 1300c corresponding to a choice of "decision," a button 1300d corresponding to a choice of "call destination registration addition," a button 1300e corresponding to a choice of "call destination registration change," and a button 1300g corresponding to a choice of "setting end" are displayed in association with the bifurcation process of S1120, and as a button is selected by the remote controller 120 of the television receiving device 1, a process corresponding to each button is executed.

FIG. 14 illustrates an example of information registered in the individual information storage region 104a or 204a in association with the call destination account. A member name 14b corresponding to a call destination account name 14a, registered face image data 14c, and face recognition data 14d for recognizing a face of each member are registered. As the face recognition data, for example, data obtained by numericalizing features of a face such as a positional relation of eyes and a nose is used. The face recognition of the member of the call destination account may be performed in the call destination member setting process of S1212 through the same process as the new registration process of S711 of the member of the user account. For example, the face recognition is performed using an image file of a photograph or a video in which the member of the call destination account stored in the user data storage region 104c or 204b is shown as the face image source, and the result is registered. Alternatively, the face recognition may be performed using a face of a counterpart whose is on a call, and the result may be registered.

FIG. 15 illustrates an example of background setting data that is individually set in association with a call source and a call destination. Background setting data 15b for members of the call destination accounts is stored in association with members 15a of the user accounts of the call sources. For example, when the member of the user account of the call source is not designated, and the call destination account is "Oooo Yyyy," the background setting is A2 (this corresponds to the case in which only the user accounts are designated as the call source and the call destination, and a call is performed without designation of a specific member such as the case in which only an account is set on the setting screen of FIG. 12 without designation of a member. There are cases in which no member is designated as a call source even when it is a registered member as well as a non-registered user), and when the member of the user account is "Cccc," and the call destination account is a member "Qqqq" of "Oooo Yyyy," the background setting is B2 (this corresponds to the case in which the members of the user accounts are designated as the call source and the call destination, and then a call is performed).

FIG. 16 illustrates an example of the background setting data. For example, in a background number A1, a setting is performed such that there is no background image, and an image acquired by the imaging unit of the video telephone device of the call source is displayed on the screen of the video telephone device of the call destination together with a person and a background without change. In a background number A2, a setting is performed such that a background image acquired by the imaging unit of the video telephone device of the call source is not transmitted, and the background image of the call source is displayed on the screen of the video telephone device of the call destination. Further, in background numbers B1 and B2, a setting is performed such that an image of a person acquired by the imaging unit of the video telephone device of the call source is synthesized with a selected background image and then displayed on the screen of the video telephone device of the call destination.

As described above, as the member of the call destination is set in the call destination member setting process of S1212, the background image in the image transmitted to the call destination is selected according to the member of the call source and the member of the call destination (whether or the member is designated other than whether or not the member is registered). Thus, for example, when the users who are not close to each other perform a call, an undesirable situation in which an image showing a state of a room as a background image is supplied is solved, and thus a video call environment with excellent usability is provided (for example, there are cases in which it is desired to change a background even between registered members such as parents and a child or between children. For example, when a call is performed between children, children may like to change to backgrounds of their favorite characters.).

Next, the call process of S523 in FIG. 5 will be described.

Figure 17:
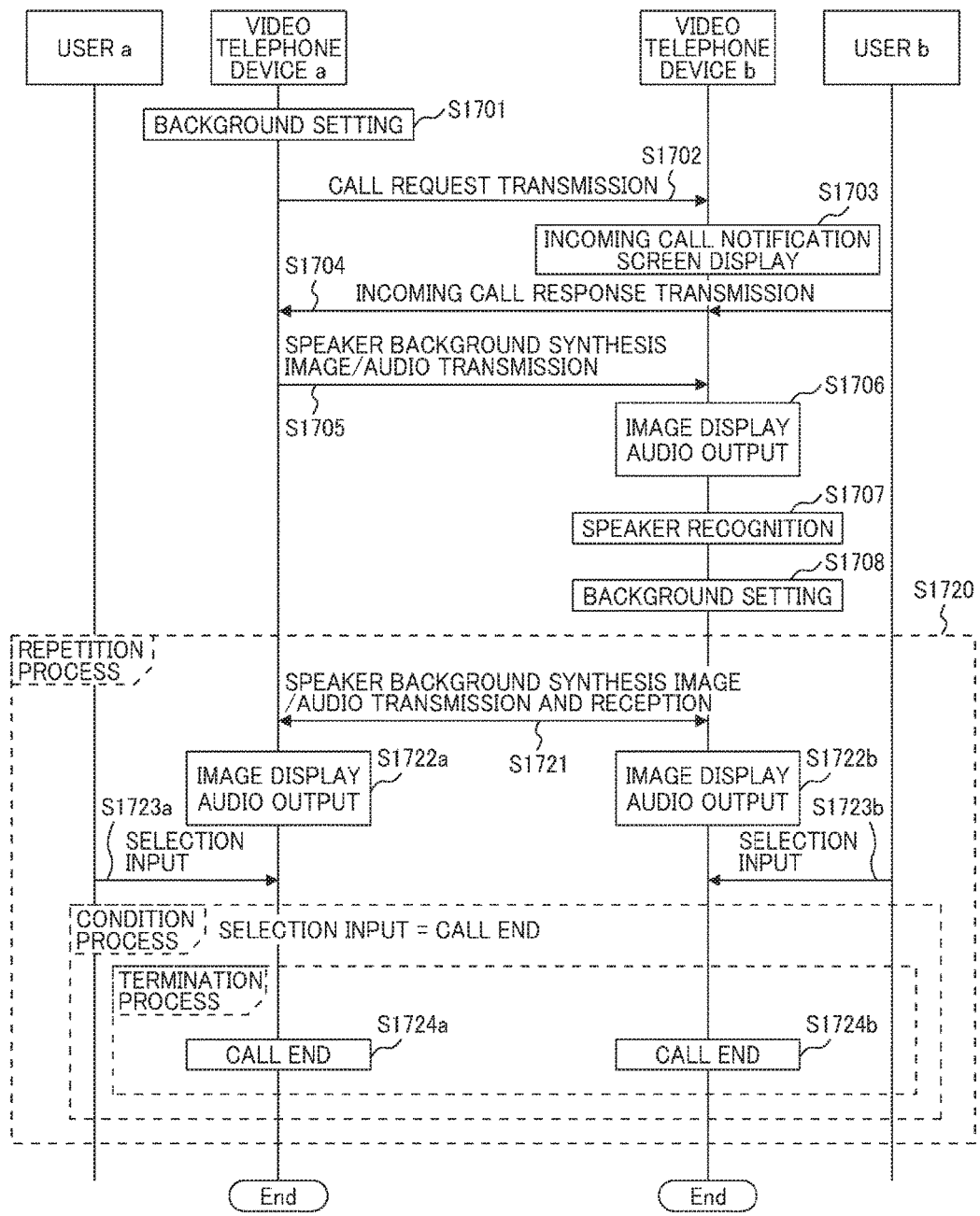
FIG. 17 is a sequence diagram illustrating an example of a call process.

FIG. 17 is a sequence diagram illustrating an example of the call process of S523 according to the embodiment of the present invention. This example is an example in which the video telephone device a of the user a of the call source performs a video call with the video telephone device b of the user b of the call destination.

First, the video telephone device a sets the background image according to the background setting data corresponding to the call source and the call destination illustrated in FIG. 15 based on the member name of the account designated as the call destination (S1701). Then, the video telephone device a of the call source transmits a call request to the account of the call destination selected in the call destination selection process of S522 based on the call destination information acquired in the call destination information request/acquisition process of S1101 (S1702). Upon receiving the telephone call, the video telephone device b of the call destination causes a screen informing of an incoming call to be displayed on the display unit (S1703). When the user b of the call destination answers the incoming call (S1704), the video telephone device b of the call destination transmits an incoming call response to the video telephone device a of the call source. As a result, a communication path for a video call is established between the video telephone device a and the video telephone device b.

The video telephone device a starts to transmit an image obtained by synthesizing an image acquired by the imaging unit of the video telephone device a of the call source with the background image according to the background setting data and a sound (S1705). The video telephone device b displays the received image and outputs the sound (S1706), and recognizes the user a of the call source using the face recognition data of the member of the account of the user a of the call source stored in the individual information storage region of the video telephone device b as illustrated in FIG. 14 and the received image (S1707). The background image is set according to the background setting data corresponding to the call source and the call destination stored in the individual information storage region of the video telephone device b (S1708). Then, the repetition process of S1720 is executed until the selection of "call end" is input from the user a or the user b.

In the repetition process of S1720, the video telephone device a and the video telephone device b performs transmission and reception of the image obtained by synthesizing the image acquired by the imaging unit of the video telephone device with the set background image and the sound (S1721), and displays the received image and outputs the sound (S1722a and S1722b). The condition process is performed based on a selection input (S1723a and S1723b) from the user a or the user b, and when "call end" is selected, a call end process (S1724a and S1724b) is performed, the repetition process stops, and the call process ends.

In the present embodiment, the video telephone device b at the called side performs the face recognition of the user b at the time of login, and recognizes the face of the user a at the calling side using the image transmitted from the video telephone device a, and thus it is possible to specify the members of the accounts of the calling side and the called side, and it is possible to set the background according to the member. Further, when the user a of the calling side is not registered as the member, it is possible to perform a setting such that neither an image photographed by the imaging unit of the call source nor the background image is transmitted to the video telephone device a.

Figure 18:
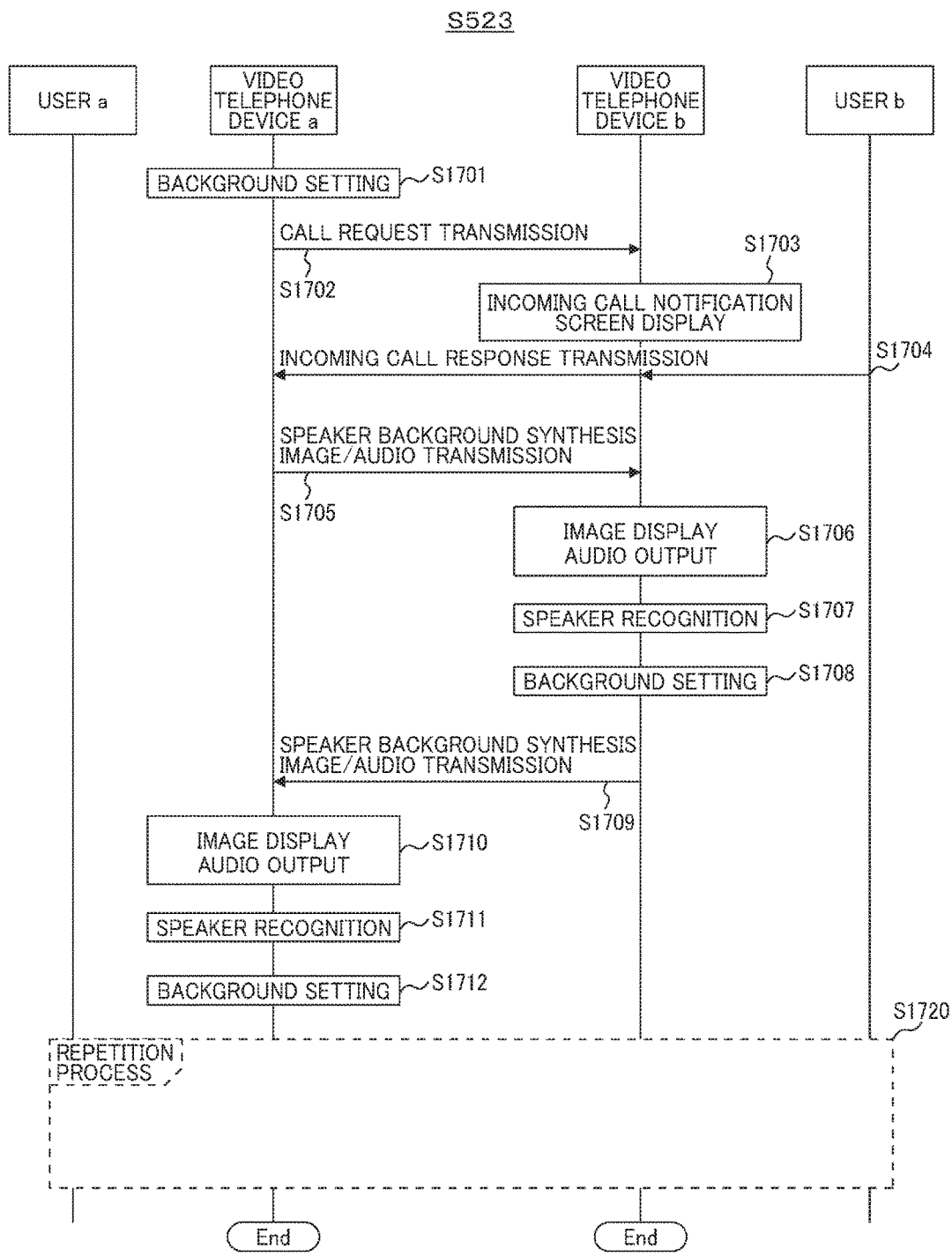
FIG. 18 is a diagram illustrating a second example of a sequence diagram of a call process.

FIG. 18 illustrates a second example of the sequence diagram of the call process of S523 according to the embodiment of the present invention. In FIG. 18, the same processes as in the sequence diagram of FIG. 17 are denoted by the same reference numerals, and a description thereof is omitted.

Referring to FIG. 18, the video telephone device b sets the background image according to the background setting data corresponding to the call source and the call destination stored in the individual information storage region (S1708), and starts to transmit the image obtained by synthesizing the image acquired by the imaging unit of the video telephone device b of the call destination with the set background image and the sound (S1709). The video telephone device a displays the received image and outputs the sound (S1710), and recognizes the user b of the call destination using the face recognition data of the member of the account of the call destination stored in the individual information storage region of the video telephone device a and the received image (S1711). The background image is set according to the background setting data corresponding to the call source and the call destination stored in the individual information storage region of the video telephone device a (S1712). Then, the repetition process of S1720 is executed until the selection of "call end" is input from the user a or the user b.

In the process illustrated in the second example of the sequence diagram, even when the user b of the call destination who transmits the incoming call response is not the member of the accounted selected as the call destination by the user a of the call source, the video telephone device a performs the face recognition based on the image transmitted from the video telephone device b, and sets the background image according to the recognition result, and thus it is possible to set the background according to the members of the accounts of the calling side and the called side.

Figure 19:
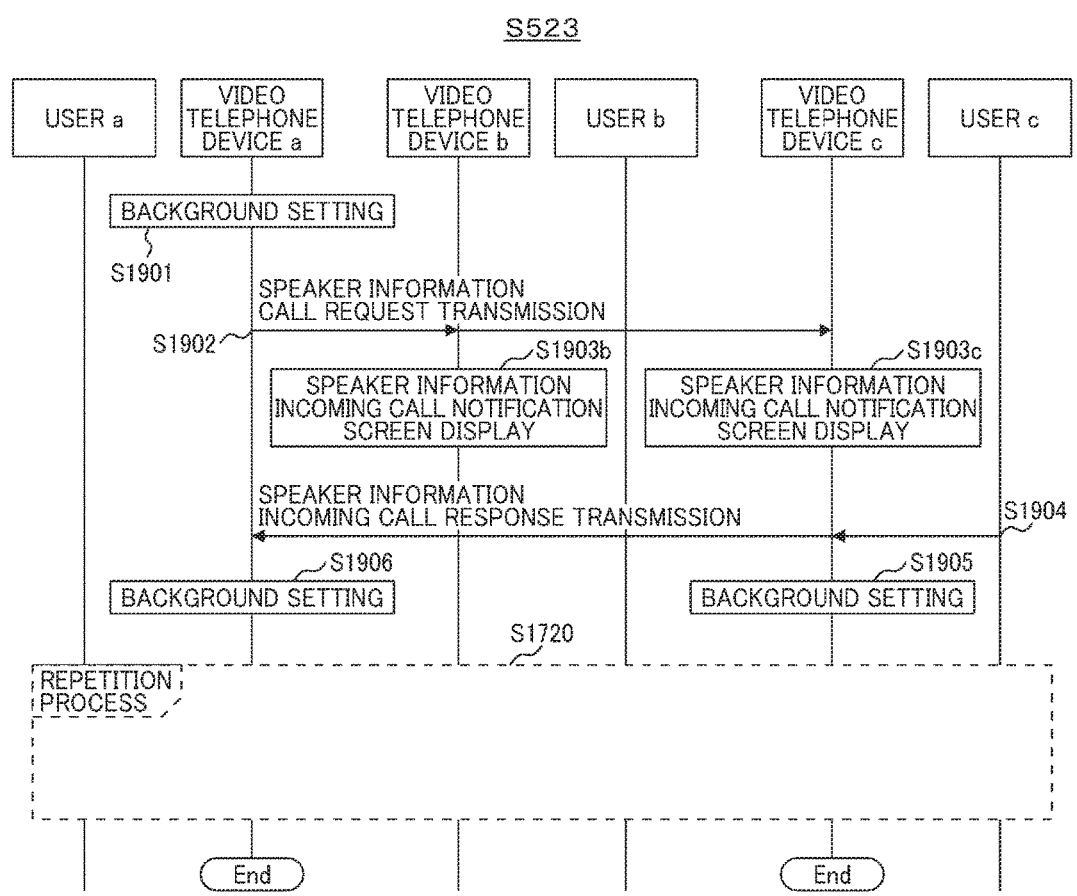
FIG. 19 is a diagram illustrating a third example of a sequence diagram of a call process.

FIG. 19 illustrates a third example of the sequence diagram of the call process of S523 according to the embodiment of the present invention. In FIG. 19, the same processes as in the sequence diagram of FIG. 17 are denoted by the same reference numerals, and a description thereof is omitted. This example corresponds to the case in which a plurality of video telephone devices using the same account log in the video telephone server 3 such as the case in which different members log in the video telephone server 3 through the television receiving device 1 and the terminal device 2 using the same account.

First, the video telephone device a sets the background image according to the background setting data corresponding to the call source and the call destination illustrated in FIG. 15 based on the member name of the account designated as the call destination (S1901). Then, the video telephone device a of the call source transmits speaker information such as the member name of the user a and the member name of the account designated as the call destination and a telephone call to the video telephone device b and a video telephone device c that log in using the account designated as the call destination based on based on the call destination information acquired in the call destination information request/acquisition process of S1101 (S1902). Upon receiving the telephone call, the video telephone device b and the video telephone device c of the call destination cause the information such as the member name of the user a of the account of the call source and the member name of the account designated as the call destination and a screen informing of an incoming call to be displayed on the display unit (S1903b and S1903c).

Here, a user c is assumed to be identical to the member name of the account designated as the call destination. When the user c answers the incoming call (S1904), a video telephone device c transmits the speaker information such as the member name of the user c recognized at the time of login and an incoming call response. The video telephone device a receives the incoming call response from the video telephone device c, and thus a communication path for a video call is established between the video telephone device a and the video telephone device c.

Further, a background image is set according to the background setting data corresponding to the call source and the call destination stored in the individual information storage region of the video telephone device c based on the member name of the user a of the account of the call source received by the video telephone device c (S1905). A background image is set according to the background setting data corresponding to the call source and the call destination stored in the individual information storage region of the video telephone device a based on the member name of the speaker information received by the video telephone device a (S1906). Then, the repetition process of S1720 is executed until the selection of the call end is input from the user a or the user c.

In the process illustrated in the third example of the sequence diagram, the information such as the member name of the account designated as the call destination is displayed on the video telephone device, and thus even when a plurality of video telephone devices are logged in using the same account, it is possible to check a call in which the member of the designated account is itself and respond to it. Further, since information of a member name of an account of a call counterpart or the like is transmitted, it is unnecessary to specify a member through face recognition using an image transmitted from the call counterpart, and it is unnecessary to register the face image data 14c of each member and the face recognition data 14d for recognizing the face of each member in association with the account of the call counterpart illustrated in FIG. 14.

Further, it is possible to specify the member of the call counterpart at a point in time of the telephone call and the incoming call response, and it is possible to set the background image according to the background setting data corresponding to the call counterparts of the call source and the call destination. Further, even when the user b transmits the incoming call response by mistake, it is possible to set the background image according to the background setting data corresponding to the call source and the call destination based on the member name of the speaker information received through the background setting process of S1906. Thus, when a person other than the member of the account designated as the call destination or a person not registered as a member transmits the incoming call response, it is possible to perform a setting so that the image photographed by the imaging unit of the call source is not transmitted.

Figure 20:
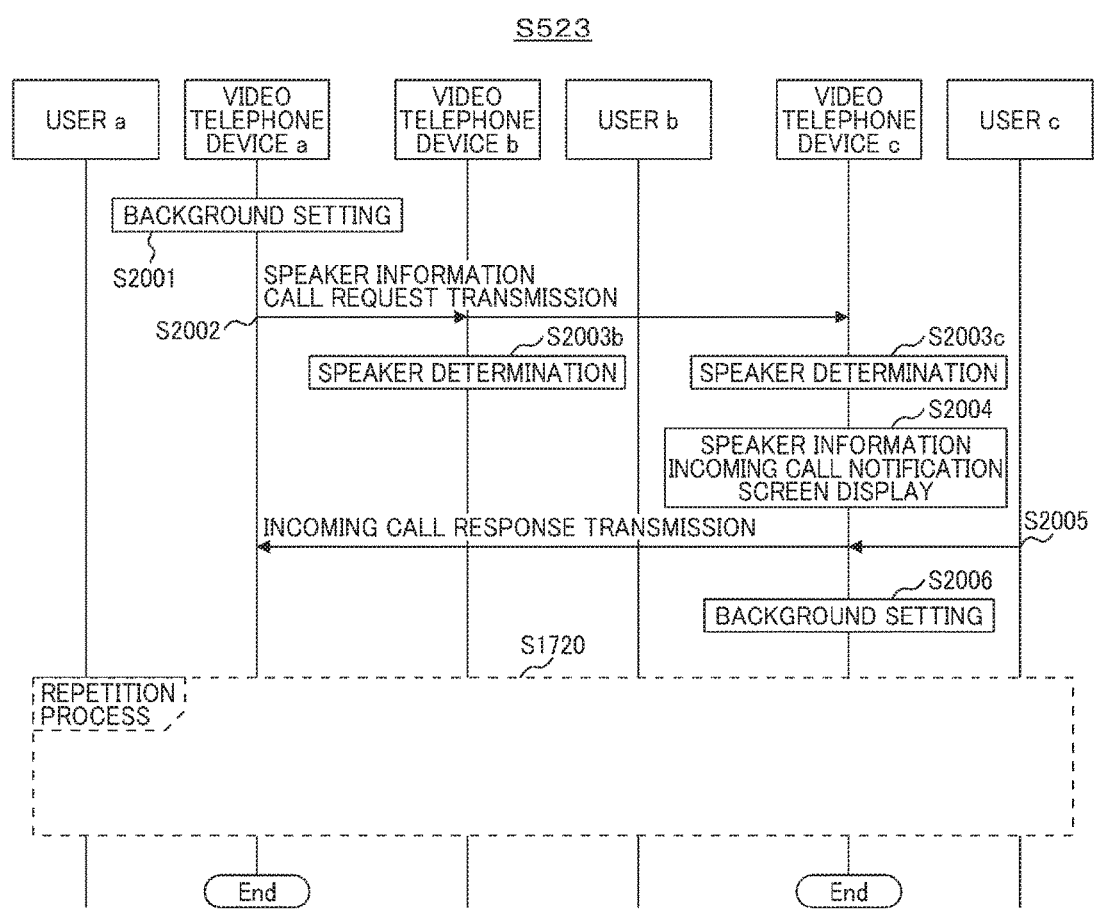
FIG. 20 is a diagram illustrating a fourth example of a sequence diagram of a call process.

FIG. 20 illustrates a fourth example of the sequence diagram of the call process of S523 according to the embodiment of the present invention. In FIG. 20, the same processes as in the sequence diagram of FIG. 17 are denoted by the same reference numerals, and a description thereof is omitted. This example corresponds to the case in which plurality of video telephone devices log in the video telephone server 3 using the same account.

First, the video telephone device a sets the background image according to the background setting data corresponding to the call source and the call destination illustrated in FIG. 15 based on the member name of the account designated as the call destination (S2001). Then, the video telephone device a of the call source transmits speaker information and a telephone call request to the video telephone device b and the video telephone device c that log in using the account designated as the call destination based on the call destination information acquired in the call destination information request/acquisition process of S1101 (S2002). the video telephone device b and the video telephone device c of the call destination perform a speaker determination process of comparing the member name of the account designated as the call destination obtained from the received information and the user name set through the login user setting process in the video telephone device b and the video telephone device c (S2003b and S2003c).

When the member name of the account designated as the call destination is identical to the user name set through the login user setting process, the display unit displays the information such as the member name of the user a of the account of the call source and the member name of the account of the call destination and a screen informing of an incoming call (S2004). Here, the user c is assumed to be identical to the member name of the account designated as the call destination. When the user c of the call destination answers the incoming call (S2005), the video telephone device c transmits the incoming call response. The video telephone device a receives the incoming call response from the video telephone device c, and thus a communication path for a video call is established between the video telephone device a and the video telephone device c.

Further, the background image is set according to the background setting data corresponding to the call source and the call destination stored in the individual information storage region of the video telephone device c based on the member name of the user a of the account of the call source received by the video telephone device c (S2006). Then, the repetition process of S1720 is executed until the selection of the call end is input from the user a or the user c.

In the process illustrated in the fourth example of the sequence diagram, the incoming call notification is displayed only on the video telephone device in which the member name of the account designated as the call destination is identical to the user name set through the login user setting process in the video telephone device, and thus even when a plurality of video telephone devices are logged in using the same account, the member of the designated account can answer it. Further, since information of a member name of an account of a call counterpart or the like is transmitted, it is unnecessary to specify a member through face recognition using an image transmitted from the call counterpart, and it is unnecessary to register the face image data 14c of each member and the face recognition data 14d for recognizing the face of each member in association with the account of the call counterpart illustrated in FIG. 14. Furthermore, it is possible to specify the member of the call counterpart at a point in time of the telephone call and the incoming call response, and it is possible to set the background image according to the background setting data corresponding to the call counterparts of the call source and the call destination.

Figure 21:
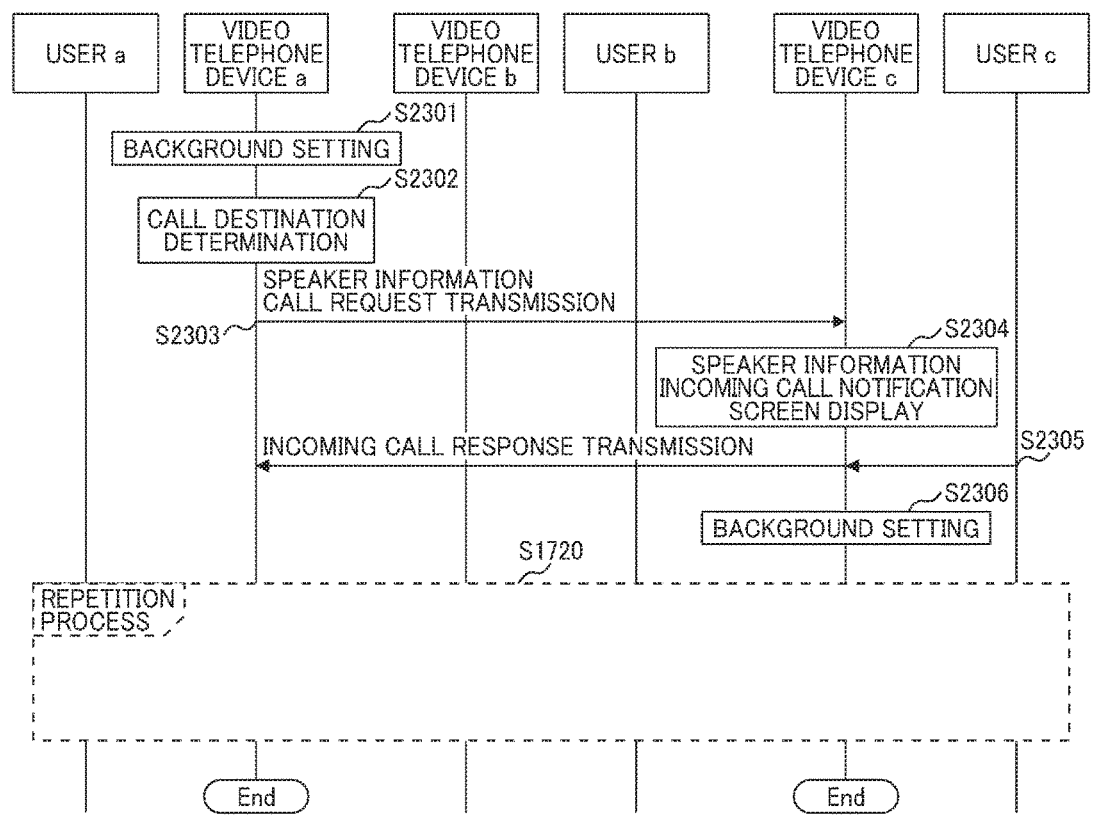
FIG. 21 is a diagram illustrating a fifth example of a sequence diagram of a call process.

FIG. 21 illustrates a fifth example of the sequence diagram of the call process of S523 according to the embodiment of the present invention. In FIG. 21, the same processes as in the sequence diagram of FIG. 17 are denoted by the same reference numerals, and a description thereof is omitted.

First, the video telephone device a sets the background image according to the background setting data corresponding to the call source and the call destination stored in the individual information storage region of the video telephone device a based on the member name of the account designated as the call destination (S2301). Then, the video telephone device of the call destination is decided based on the call destination information such as the account in the login state, the IP address information of the video telephone device, and the member name which are acquired through the call destination information request/acquisition process of S1101 (S2302), and the telephone call is transmitted to the video telephone device c that is logged in by the member of the account designated as the call destination (S2303).

Upon receiving the speaker information and the telephone call, the video telephone device c causes the information such as the member name of the user a of the account of the call source and the member name of the account of the call destination and the screen informing of the incoming call to be displayed on the display unit (S2304). When the user c of the call destination answers the incoming call (S2305), the video telephone device c transmits the incoming call response to the video telephone device a. The video telephone device a receives the incoming call response from the video telephone device c, and thus a communication path for a video call is established between the video telephone device a and the video telephone device c.

Further, the background image is set according to the background setting data corresponding to the call source and the call destination stored in the individual information storage region of the video telephone device c based on the received member name of the user a of the account of the call source (S2306). Then, the repetition process of S1720 is executed until the selection of the call end is input from the user a or the user c.

In the process illustrated in the fifth example of the sequence diagram, as the call destination information such as the account in the login state, the IP address of the video telephone device, and the member name acquired through the call destination information request/acquisition process of S1101 are acquired, the incoming call notification is displayed on the video telephone device that is logged in by the member of the account designated as the call destination, and thus even when a plurality of video telephone devices are logged in using the same account, the member of the designated account can respond to it. Further, since information of a member name of an account of a call counterpart or the like is transmitted, it is unnecessary to specify a member through face recognition using an image transmitted from the call counterpart, and it is unnecessary to register the face image data 14c of each member and the face recognition data 14d for recognizing the face of each member in association with the account of the call counterpart illustrated in FIG. 14. Furthermore, it is possible to specify the member of the call counterpart at a point in time of the telephone call and the incoming call response, and it is possible to set the background image according to the background setting data corresponding to the call counterparts of the call source and the call destination.

Figure 22:
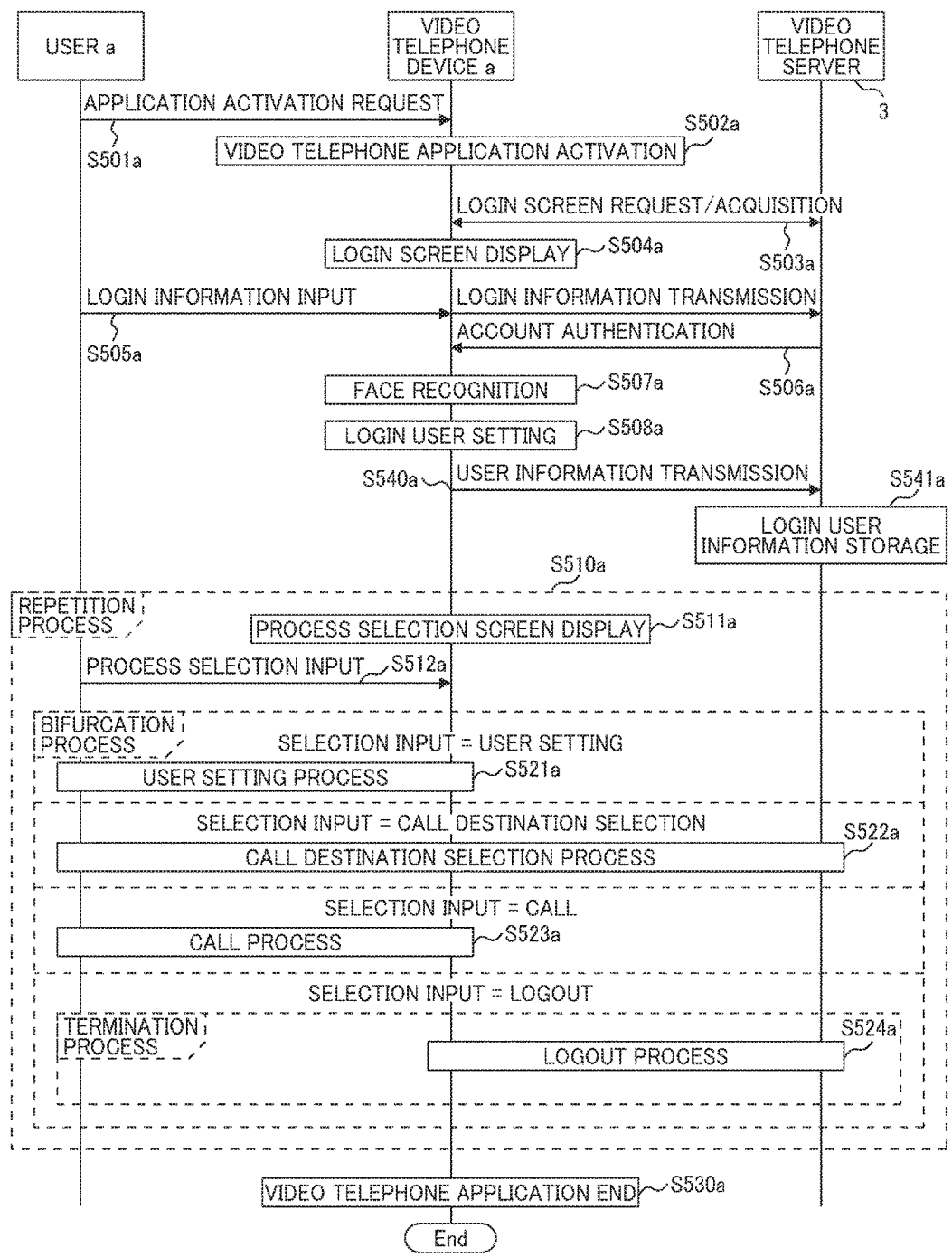
FIG. 22 is a diagram illustrating a second example of a sequence diagram of a video call process.

FIG. 22 is a diagram illustrating a second example of the diagram of the video call process according to the embodiment of the present invention. In FIG. 22, the same processes as in the sequence diagram of FIG. 5 are denoted by the same reference numerals, and a description thereof is omitted. FIG. 22 illustrates only a process portion of the video telephone device a of the user a and the video telephone server 3, and the same process is performed even in the video telephone devices of the other users.

The user a of the video telephone device a selects the video call application from the menu screen, and makes the activation request (S501a). As a result, the video call application is activated (S502a), access to the video telephone server 3 is performed, and the login screen information is requested and acquired (S503a).

Then, the video telephone device a display the login screen (S504a), and when the user a inputs the user account and the password (S505a), the login information of the input user account and the password is transmitted from the video telephone device a to the video telephone server 3.

The video telephone server 3 authenticates the user account when the user is determined to be a legitimate registered user with reference to the user information accumulated in the storage unit 303 (S506a).

Then, the video telephone device a performs the face recognition process based on the image of the user input from the imaging unit (S507a). When the face recognized by the face recognition process is identical to the face of the member that has been registered in advance, the recognized member name is set as the logged-in user, and when the face recognized by the face recognition process is not identical to the face of the member that has been registered in advance, the logged-in user is set to as the account name (S508a).

Here, when a plurality of members are recognized, a plurality of member names are set as the user. Then, the user information such as the member name set as the user is transmitted to the video telephone server 3 (S540a). The video telephone server 3 stores the information such as the logged-in account name, the IP address information of the video telephone device, and the member name in the memory 302 or the storage unit 303 from the user information (S541a). Thereafter, the repetition process of S510a is performed until the user selects "logout."

FIG. 23 illustrates another example of a display of the television receiving device 1 in the call destination selection process of S522.

The video telephone server 3 may acquire the information such as the account name and the member name of the logged-in user stored in the logged-in user information storage process of S541 in the call destination information request/acquisition process of S1101 of FIG. 11, display the login state of each member name of the account of the call destination, and designate the call destination.

In the above embodiment, the face recognition is performed as the method of specifying the member of the account of the call destination, but voice recognition data of the member of the account of the call destination may be stored, and the member of the account of the call destination may be specified by voice recognition. Further, in the present embodiment, the members of the call source and the call destination individually set the background image, but the present embodiment is not limited to the background image, and any other item may individually be set, for example, a volume may be set to be increased when a member whose voice is difficult to hear is the call destination.

The setting of the background image corresponding to the member name registered in association with the account and the members of the call source and the call destination are stored in the individual information storage region of the video telephone device, but the present invention is not limited thereto, and it may be stored as the user information of the storage unit 303 of the video telephone server. As a result, it is unnecessary to set the background image corresponding to the member name to be registered in association with the account and the members of the call source and the call destination through the individual video telephone device, and it is possible to perform a setting corresponding to the members of the call source and the call destination through a plurality of video telephone devices.

Further, in the present embodiment, the call destination information request/acquisition is performed on the video telephone server 3 in the call destination information request/acquisition process of S1101, but the present invention is not limited thereto, and the call destination information request/acquisition may be performed on a device that holds information such as an account in the login state and an IP address of the video telephone device such as a "super node" used in the Skype.

The embodiment is an example described in detail to facilitate understanding of the present invention and not limited to a configuration necessarily including all the components described above. Some of the components of each embodiment may be changed such that a component is added, deleted, or replaced. The sequence of each embodiment may be changed such that a process is added, deleted, or replaced, or an order is changed within the scope not departing from the gist of the present invention. All or some of the components, the functions, the processing units, the processing means, or the like may be implemented by hardware, for example, they may be designed by an integrated circuit.

The components, the functions, or the like may be implemented by software such that a program for implementing respective functions is interpreted and executed through a processor. Information for implementing the functions such as a program, a table, or a file may be placed in the memory 103 or 203 or the storage unit 104 or 204.

Further, a control line or an information line is considered to be necessary for a description, and all control lines or information lines which are necessary in a product are not necessarily illustrated. Practically, most components may be considered to be connected with one another.

REFERENCE SIGNS LIST

1 television receiving device
2 terminal device
3 video telephone server
4, 7 router
5 external network
101, 201 control unit
102, 202 speaker recognizing unit
104, 204 storage unit
104a, 204a individual information storage unit
104c, 204b user data storage unit
114, 216 image processing unit
116, 215 display unit
115, 217 imaging unit

The invention claimed is:

1. A video telephone device, comprising:
an imaging unit that images an image;
an image processing unit that generates image information including the image imaged by the imaging unit;
a communication unit that transmits the image information generated by the image processing unit to another video telephone device and receives image information including an image imaged by an imaging unit of the other video telephone device;
a display unit that displays the image information from the other video telephone device received by the communication unit;
an individual information storage unit that stores account information identifying members who are able to perform a call using the video telephone device and/or the other video telephone device, member information of the members registered in association with the account information, speaker recognition information for recognizing a speaker using the video telephone device and a speaker using the other video telephone device, and individual setting information according to a combination of the member of the video telephone device and the member of the other video telephone device;
a speaker recognizing unit that recognizes the speaker using the video telephone device and the speaker using the other video telephone device based on the speaker recognition information stored in the individual information storage unit; and
a control unit that sets the image information to be transmitted to the other video telephone device through the communication unit or a display of the image information to be displayed on the display unit based on a recognition result of the speaker recognizing unit and the individual setting information stored in the individual information storage unit.

2. The video telephone device according to claim 1, wherein the individual setting information is information related to a background image of the image information, and the control unit controls the image processing unit such that the background image is set based on the speaker recognition information.

3. The video telephone device according to claim 1, wherein the speaker recognition information includes first image information related to a face of the member of the video telephone device imaged by the imaging unit and second image information related to a face of the member of the other video telephone device received through the communication unit, and the speaker recognizing unit recognizes the speaker using the video telephone device based on the image information generated from the image imaged by the imaging unit during a call and the first image information, and recognizes the speaker using the other video telephone device based on the image information that is received through the communication unit during a call and related to the speaker using the other video telephone device and the second image information.

4. The video telephone device according to claim 1, further comprising, a microphone that acquires a sound generated by the speaker using the video telephone device, wherein the speaker recognizing unit recognizes the speaker using the video telephone device based on audio information generated from the sound acquired by the microphone, and recognizes the speaker using the other video telephone device based on audio information received through the communication unit.

5. A video telephone processing method of a video telephone device of communicating image information including an imaged image between the video telephone device and another video telephone device via a network, the video telephone processing method comprising:

a reception step of receiving image information transmitted from the other video telephone device;

a recognition step of recognizing a speaker using the other video telephone device when the image information is received in the reception step;

an image processing step of generating a synthetic image in which an image of the speaker using the video telephone device is synthesized with the background image based on a recognition result in the recognition step; and a transmission step of transmitting the synthetic image to the other video telephone device.

6. The video telephone processing method of the video telephone device according to claim 5, wherein, in the recognition step, the speaker using the other video telephone device is recognized based on the image information received in the reception step.

7. The video telephone processing method of the video telephone device according to claim 5, wherein, in the recognition step, the speaker using the other video telephone device is recognized based on speaker information accompanied with the image information received in the reception step, and the video telephone processing method further comprises a transmission step of transmitting speaker information for recognizing the speaker using the video telephone device to the other video telephone device.

8. The video telephone processing method of the video telephone device according to claim 7, wherein the background image is set based on the speaker information for recognizing the speaker using the other video telephone device received in the reception step and the speaker information for recognizing the speaker using the video telephone device, in the image processing step, an image of the speaker using the video telephone device is selected based on the speaker information received in the reception step, and a synthetic image in which the background image is synthesized with the selected image is generated, and the synthetic image generated in the image processing step is transmitted to the other video telephone device.

9. The video telephone processing method of the video telephone device according to claim 7, wherein the speaker information for recognizing the speaker using the other video telephone device received in the reception step and the speaker information for recognizing the speaker using the video telephone device are.

10. A video telephone processing method in a video telephone system including a video telephone device, another video telephone device, and a video telephone server used for communicating image information including an imaged image between the video telephone device and the other video telephone device via a network, the video telephone processing method comprising:

a recognition step of recognizing a speaker using the video telephone device and generating speaker information related to the speaker;

a selection step of selecting another video telephone device to communicate with the video telephone device based on the speaker information generated in the recognition step;

an acquisition step of acquiring the speaker information related to the speaker using the other video telephone device selected in the selection step; and a transmission step of transmitting the speaker information related to the speaker using the video telephone device to the other video telephone device used by the speaker corresponding to the speaker information acquired in the acquisition step, wherein, in the selection step, another video telephone device that logs in the video telephone server is selected as the video telephone device to communicate.

* * * * *